United States Patent
Becker et al.

(10) Patent No.: US 10,630,655 B2
(45) Date of Patent: Apr. 21, 2020

(54) POST-QUANTUM SECURE PRIVATE STREAM AGGREGATION

(71) Applicant: Robert Bosch GmbH, Stuttgart (DE)

(72) Inventors: Daniela Becker, Pittsburgh, PA (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 15/979,761

(22) Filed: May 15, 2018

(65) Prior Publication Data

US 2018/0337899 A1 Nov. 22, 2018

Related U.S. Application Data

(60) Provisional application No. 62/508,140, filed on May 18, 2017.

(51) Int. Cl.
*H04L 29/06* (2006.01)
*H04L 9/00* (2006.01)
(Continued)

(52) U.S. Cl.
CPC .......... *H04L 63/0457* (2013.01); *H04L 9/008* (2013.01); *H04L 9/0825* (2013.01);
(Continued)

(58) Field of Classification Search
CPC ............. H04L 63/0457; H04L 63/0428; H04L 9/3093; H04L 9/008; H04L 9/304;
(Continued)

(56) References Cited

U.S. PATENT DOCUMENTS 10,296,709 B2 * 5/2019 Laine .................. G06F 21/6245
2011/0243320 A1 10/2011 Halevi et al.
(Continued)

OTHER PUBLICATIONS

Peng, Zhang et al., "A Homomorphic Aggregate Signature Scheme Based on Lattice", Chinese Journal of Electronics vol. 21, No. 4, Oct. 2012, 99 pages. (Year: 2012).*
(Continued)

*Primary Examiner* — Michael Pyzocha
(74) *Attorney, Agent, or Firm* — Maginot, Moore & Beck LLP

(57) ABSTRACT

A method for operating an aggregator in a private stream aggregation (PSA) system has been developed. The method includes receiving a plurality of encrypted messages from a plurality of clients, each encrypted message corresponding to a vector in a learning with errors (LWE) public key, adding, the plurality of encrypted messages to generate an aggregate data set, extracting a summation of a plurality of error vectors in the plurality of encrypted messages from the aggregate data set, decrypting the summation of the encrypted data contained in the plurality of encrypted messages using a private key stored in the memory of the aggregator to generate a plaintext sum of noisy data generated by the plurality of clients, and generating, with the processor, an output of the plaintext sum of noisy data that preserves differential privacy of each client in the plurality of clients.

20 Claims, 11 Drawing Sheets

(51) Int. Cl.
H04L 9/30 (2006.01)
H04L 9/08 (2006.01)
H04L 9/14 (2006.01)
G06N 10/00 (2019.01)
H04L 29/08 (2006.01)

(52) U.S. Cl.
CPC .......... *H04L 9/0852* (2013.01); *H04L 9/0869* (2013.01); *H04L 9/14* (2013.01); *H04L 9/304* (2013.01); *H04L 9/3093* (2013.01); *H04L 63/0428* (2013.01); *G06N 10/00* (2019.01); *H04L 63/0414* (2013.01); *H04L 67/10* (2013.01); *H04L 67/42* (2013.01)

(58) Field of Classification Search
CPC ....... H04L 9/14; H04L 9/0869; H04L 9/0852; H04L 9/0825; H04L 67/42; H04L 67/10; H04L 63/0414; G06N 10/00
See application file for complete search history.

(56) References Cited

U.S. PATENT DOCUMENTS

| | | | |
|---|---|---|---|
| 2012/0204026 A1* | 8/2012 | Shi ................... | H04L 9/3006 713/155 |
| 2013/0170640 A1* | 7/2013 | Gentry ............... | H04L 9/008 380/30 |
| 2014/0177828 A1* | 6/2014 | Loftus ............... | H04L 9/008 380/44 |
| 2015/0067336 A1* | 3/2015 | Ding ................. | H04L 9/0819 713/171 |
| 2015/0154422 A1* | 6/2015 | Ben Hamouda ...... | H04L 9/008 713/189 |
| 2015/0372808 A1* | 12/2015 | Bilogrevic ........... | G06N 7/005 380/279 |
| 2017/0155628 A1* | 6/2017 | Rohloff ............. | H04L 9/30 |
| 2017/0366358 A1* | 12/2017 | Lyubashevsky ..... | H04L 9/3255 |
| 2018/0309574 A1* | 10/2018 | Lyubashevsky ..... | H04L 9/3218 |
| 2018/0324175 A1* | 11/2018 | Campagna .......... | H04L 63/0823 |

OTHER PUBLICATIONS

Cheon, Jung Hee et al., "A Practical Post-Quantum Public-Key Cryptosystem Based on spLWE", Information Security and Cryptology—ICISC 2016. ICISC 2016. Lecture Notes in Computer Science, vol. 10157. Springer, Cham, pp. 1-19. (Year: 2016).*
Agarkar, Aarti et al., et al., "R-LWE based Lightweight Privacy Preserving Scheme for Smart Grid", 2016 International Conference on Computing, Analytics and Security Trends (CAST) College of Engineering Pune, India. Dec. 19-21, 2016, pp. 410-415. (Year: 2016).*
Aono, Yoshinori et al., "Input and Output Privacy-Preserving Linear Regression", IEICE Trans. Inf. & Syst., vol. E100-D, No. 10 Oct. 2017, pp. 2339-2347. (Year: 2017).*
Saarinen, Markku-Juhani O., "Ring-LWE Ciphertext Compression and Error Correction", IoTPTS'17, Apr. 2, 2017, Abu Dhabi, United Arab Emirates, pp. 15-22. (Year: 2017).*
Bos, Joppe et al., "Frodo: Take off the Ring! Practical, Quantum-Secure Key Exchange from LWE", CCS'16 Oct. 24-28, 2016, Vienna, Austria, pp. 1006-1018. (Year: 2016).*
Shi, Elaine et al., "Privacy-Preserving Aggregation of Time-Series Data," Network and Distributed System Security Symposium (NDSS), 2011 (17 pages).
Bansarkhani, Rachid et al., "Augmented Learning with Errors: The Untapped Potential of the Error Term," Financial Cryptography and Data Security: 19th International Conference, FC 2015 (27 pages).
Antikainen, M. et al., "Denial-of-Service Attacks in Bloom-Filter-Based Forwarding," IEEE/ACM Transactions on Networking, vol. 22, No. 5, pp. 1463-1476, Oct. 2014 (14 pages).
Applebaum, B. et al., "Fast Cryptographic Primitives and Circular-Secure Encryption Based on Hard Learning Problems," International Association for Cryptologic Research, CRYPTO 2009, LNCS 5677, pp. 595-618, 2009 (24 pages).
Asharov, G. et al., "Multiparty Computation with Low Communication, Computation and Interaction via Threshold FHE," International Association for Cryptologic Research, EUROCRYPT 2012, LNCS 7237, pp. 483-501, 2012 (19 pages).
Brakerski, Z. et al., "Fully Homomorphic Encryption without Bootstrapping," Electronic Colloquium on Computational Complexity, 2011 (27 pages).
Brakerski, Z. et al., "Efficient Fully Homomorphic Encryption from (Standard) LWE", in Proceedings of 2011 52nd Annual IEEE Symposium on Foundations of Computer Science, pp. 97-106 (10 pages).
Brakerski, Z. et al., "Fully Homomorphic Encryption from Ring-LWE and Security for Key Dependent Messages," International Association for Cryptologic Research, CRYPTO 2011, LNCS 6841, pp. 505-524, 2011 (20 pages).
Chan, T-H. Hubert et al., "Privacy-Preserving Stream Aggregation with Fault Tolerance," IACR Cryptology ePrint Archive, 2011 (20 pages).
Damgård, I et al., "Practical Covertly Secure MPC for Dishonest Majority—Or: Breaking the SPDZ Limits," Springer-Verlag Berlin Heidelberg, in Proceedings of ESORICS 2013, LNCS 8134, pp. 1-18, 2013 (18 pages).
Danezis, G. et al., "Smart Meter Aggregation via Secret-Sharing," ACM, in Proceedings of SEGS'13, pp. 75-80, 2013 (6 pages).
Ding, J. et al., "A Simple Provably Secure Key Exchange Scheme Based on the Learning with Errors Problem," IACR Cryptology ePrint Archive, 2012 (15 pages).
Döttling, N. et al., "Lossy Codes and a New Variant of the Learning-with-Errors Problem," International Association for Cryptologic Research, EUROCRYPT 2013, LNCS 7881, pp. 18-34, 2013 (17 pages).
Duchi, J.C. et al., "Local Privacy and Statistical Minimax Rates," in Proceedings of 2013 IEEE 54th Annual Symposium on Foundations of Computer Science, pp. 429-438, 2013 (10 pages).
Dwork, C. et al., "The Algorithmic Foundations of Differential Privacy," Now Publishers, Published in Foundations and Trends in Theoretical Computer Science, vol. 9, pp. 211-407, 2014 (281 pages).
El Bansarkhani, Rachid et al., "Augmented Learning with Errors: The Untapped Potential of the Error Term," 19th International Conference on Financial Cryptography and Data Security, 2015 (20 pages).
Erlingsson, U. et al., "RAPPOR: Randomized Aggregatable Privacy-Preserving Ordinal Response," in Proceedings of the 2014 ACM SIGSAC Conference on Computer and Communications Security, CCS '14, pp. 1054-1067, 2014 (14 pages).
Fredrikson, M. et al., "Privacy in Pharmacogenetics: An End-to-End Case Study of Personalized Warfarin Dosing," USENIX Association, Proceedings of 23rd USENIX Security Symposium, pp. 17-32, 2014 (16 pages).
Gentry, C. et al., "Homomorphic Evaluation of the AES Circuit," International Association for Cryptologic Research, CRYPTO 2012, LNCS 7417, pp. 850-867, 2012 (18 pages).
Gentry, C. et al., "Trapdoors for Hard Lattices and New Cryptographic Constructions," in Proceedings of 40th Annual ACM Symposium on Theory of Computing, STOC '08, pp. 197-206, 2008 (10 pages).
Gentry, C. et al., "Homomorphic Encryption from Learning with Errors: Conceptually-Simpler, Asymptotically-Faster, Attribute-Based," International Association for Cryptologic Research 2013, CRYPTO 2013, Part I, LNCS 8042, pp. 75-92, 2013 (18 pages).
Goldreich, O. et al., "How to Play any Mental Game," in Proceedings of the Nineteenth Annual ACM Symposium on Theory of Computing, STOC '87, pp. 218-229, 1987 (12 pages).
Goldreich, O., "Secure Multi-Party Computation," pp. 1-109, 1998, retrieved from Internet: www.wisdom.weizmann.ac.il/~oded/PSX/prot.pdf (110 pages).
Inusah, S. et al., "A discrete analogue of the Laplace distribution," Journal of Statistical Planning and Inference, vol. 136, pp. 1090-1102, 2006 (13 pages).

(56) References Cited

OTHER PUBLICATIONS

Jawurek, M. et al., "SoK : Privacy Technologies for Smart Grids—A Survey of Options," 2012 (16 pages).
Jung, T. et al., "Privacy-Preserving Data Aggregation without Secure Channel: Multivariate Polynomial Evaluation," 2013 Proceedings of IEEE INFOCOM, pp. 2634-2642,2013 (9 pages).
Kasiviswanathan, S. P. et al., "What Can We Learn Privately," 49th Annual IEEE Symposium on Foundations of Computer Science, pp. 531-540 (2008).
Katz, J. et al., "Smooth Projective Hashing and Password-Based Authenticated Key Exchange from Lattices," International Association for Cryptologic Research, ASIACRYPT 2009, LNCS 5912, pp. 636-652,2009 (17 pages).
Li, Q. et al. "Efficient Privacy-Preserving Stream Aggregation in Mobile Sensing with Low Aggregation Error," in Proceedings of PETS 2013, LNCS 7981, pp. 60-81,2013 (22 pages).
Li, Q. et al. "Efficient and Privacy-Aware Data Aggregation in Mobile Sensing," in Transactions on Dependable and Secure Computing, 2014 (14 pages).
Lindner, R. et al., "Better Key Sizes (and Attacks) for LWE-Based Encryption," Springer-Verlag Berlin Heidelberg 2011, CT-RSA 2011, LNCS 6558, pp. 319-339,2011 (21 pages).
Lyubashevsky, V. et al., "On Ideal Lattices and Learning with Errors over Rings," International Association for Cryptologic Research, EUROCRYPT 2010, LNCS 6110, pp. 1-23,2010 (23 pages).
Lyubashevsky, V. et al., "A Toolkit for Ring-LWE Cryptography," International Association for Cryptologic Research, EUROCRYPT 2013, LNCS 7881, pp. 35-54, 2013 (20 pages).
Micciancio, D. et al., "Trapdoors for Lattices: Simpler, Tighter, Faster, Smaller," International Association for Cryptologic Research, EUROCRYPT 2012, LNCS 7237, pp. 700-718,2012 (19 pages).
Micciancio, D. et al., "Lattice-based Cryptography," Post-Quantum Cryptography, Springer, pp. 147-192, 2009 (45 pages).
Niedermeyer, S. et al., "Cryptanalysis of Basic Bloom Filters Used for Privacy Preserving Record Linkage," Journal of Privacy and Confidentiality, vol. 6, No. 2, pp. 59-79, 2014 (21 pages).
Peikert, C. et al., "Pseudorandomness of Ring-LWE for Any Ring and Modulus," in Proceedings of 49th Annual Symposium on Theory of Computing, pp. 461-473, 2017, accessed online: https://eprint.iacr.org/2017/258.pdf (26 pages).
Peikert, C. et al., "Lossy Trapdoor Functions and Their Applications," in the Proceedings of the 40th Annual ACM Symposium on Theory of Computing, STOC '08, pp. 187-196, 2008 (10 pages).
Regev, O., "On Lattices, Learning with Errors, Random Linear Codes, and Cryptography," Journal of the ACM, vol. 56, No. 6, Article 34, pp. 34:1-34:40 (40 pages).
Ullman, J. et al., "PCPs and the Hardness of Generating Private Synthetic Data," International Association for Cryptologic Research, TCC 2011, LNCS 6597, pp. 400-416, 2011 (17 pages).
Valovich, F., "On the hardness of the Learning with Errors problem with a discrete reproducible error distribution," Cornell University Library, arXiv:1605.02051, 2016, retrieved from the Internet: https://arxiv.org/abs/1605.02051 (18 pages).
Valovich, F. et al., "Private Stream Aggregation Revisited," Cornell University Library, arXiv:1507.08071, 2015, retrieved from the Internet: https://arxiv.org/abs/1507.08071 (33 pages).
Warner, S. L. et al., "Randomized Response: A Survey Technique for Eliminating Evasive Answer Bias," Journal of the American Statistical Association, vol. 60, No. 309, pp. 63-69, 1965 (7 pages).
Yao, A. C., "Protocols for Secure Computations," in Proceedings of 23rd Annual Symposium on Foundations of Computer Science, pp. 1-5, 1982 (5 pages).
Yao, A. C., "How to generate and exchange secrets," in Proceedings of the 27th Annual Symposium on Foundations of Computer Science, SFCS '86, pp. 162-167, 1986 (6 pages).
International Search Report corresponding to International Patent Application PCT/EP2018/062645 (5 pages).

* cited by examiner

|  | PRIOR ART | | EMBODIMENTS DESCRIBED HEREIN | |
|---|---|---|---|---|
| NoisyEnc$_i$ | $p \in \{0,1\}$: | 0.6 ms | $p \leq 5$:<br>$p \leq 37$:<br>$p \leq 65537$: | 3.58 ms<br>3.62 ms<br>3.73 ms |
| AggrDec | $p \in \{0,1\}$: | 300 ms | $p \leq 5$:<br>$p \leq 37$:<br>$p \leq 65537$: | 1.87 ms<br>1.88 ms<br>1.96 ms |

FIG. 5A

| $N$ | $\log(p_0 = q_0)$ | $\log(q_1 = p_0 \cdot p_1)$ |
|---|---|---|
| 100 | 31 | 36 |
| 1000 | 34 | 39 |
| 10000 | 38 | 43 |

Parameters for $p \approx 2^{16}$ and $k = 80$, $\phi(m') = 32, \phi(m) \approx 2^{11}, p_1 \approx 2^5$

550 →

| $N$ | $\log(p_0 = q_0)$ | $\log(q_1 = p_0 \cdot p_1)$ |
|---|---|---|
| 100 | 48 | 63 |
| 1000 | 49 | 64 |
| 10000 | 52 | 67 |

Parameters for $p \approx 2^{32}$ and $k = 128$, $\phi(m') = 8192, \phi(m) \approx 2^{20}, p_1 \approx 2^{15}$

560 →

| $N$ | $\log(p_0 = q_0)$ | $\log(q_1 = p_0 \cdot p_1)$ |
|---|---|---|
| 10000 | 146 | 196 |
| $10^{15}$ | 151 | 201 |
| $10^{21}$ | 171 | 221 |

Parameters for $p \approx 2^{128}$ and $k = 80$, $\phi(m') = 32768, \phi(m) \approx 2^{24}, p_1 \approx 2^{50}$

*Definition 10 (Lattice-based PSA (LaPS)):* Let $\kappa$ be a security parameter, $N \in \mathbb{N}$ the number of participants and let $\alpha \in (0,1)$ and $\beta \in (0,1]$. Let $\chi$ be a discrete noise distribution. Let AHOM = (Gen, Enc, Dec) be an asymmetric encryption scheme with pseudo-random ciphertexts that is additively homomorphic, i.e. AHOM.Dec($sk, \sum_{i=1}^{N}$ AHOM.Enc($pk, m_i$)) = AHOM.Dec($sk$, AHOM.Enc($pk, \sum_{i=1}^{N} m_i$)).
A post-quantum secure Private Stream Aggregation scheme $PQ\text{-}SPA$ = (Setup, NoisyEnc, AggrDec) consists of the following PPT-algorithms:

- $(\{\mathbf{A}, \mathbf{g}^T, pk\}, \{s_i\}, (sk_{A_1}, sk_{A_2})) \leftarrow$ Setup($1^\kappa$): Generate the public parameters $\mathbf{A}, \mathbf{g}^T$ and $pk$ as follows and distribute them to all parties.
  - Draw $\mathbf{A}$ uniformly at random from $\mathbb{Z}_q^{\kappa \times \lambda}$, where $l = \lceil \log q \rceil$ and $\lambda = x \cdot l$ for some positive integer $x$.
  - Set vector $\mathbf{g}^T = (1, 2, \ldots, 2^{l-1}) \in \mathbb{Z}_q^l$.
  - Generate $(pk, sk) \leftarrow$ AHOM.Gen and extract public key $pk \in (pk, sk)$.

For all $i \in \{1, \ldots, N\}$ draw $\mathbf{s}_i \leftarrow \mathbb{Z}_q^\kappa$ and send it to user $i$ as her secret key.
  The aggregator's secret decryption key is the tuple $(sk_{A_1}, sk_{A_2})$, where
  - $sk_{A_1} = -\sum_{i=1}^{N} \mathbf{s}_i$ and
  - $sk_{A_2} = sk \in (pk, sk) \leftarrow$ AHOM.Gen.

- $\mathbf{c}_{i,A} \leftarrow$ NoisyEnc$_i(\{\mathbf{A}, \mathbf{g}^T, pk\}, \mathbf{s}_i, d_i)$: Each user $i$ takes her data $d_{i,A} \in D$ and adds some noise $r_i$ to it, s.t. $x_i = d_i + r_i \mod q \in \mathbb{Z}_q$.
  - $r_i$ is sampled as follows:
  $$r_i = \begin{cases} 0 & \text{with probability } 1 - \beta \\ Y & \text{with probability } \beta \end{cases}, \text{ where } Y \leftarrow \chi.$$
  - Compute $\mathbf{v}_i =$ AHOM.Enc($pk, x_i$) $\in \mathbb{Z}_q^{\lambda/l}$.
  - Invoke Algorithm II for each component of $\mathbf{v}_i$ in order to sample $\mathbf{e}_i \leftarrow D_{\Lambda_{\mathbf{v}_i}^\perp(\mathbf{G}), \sigma} \in \mathbb{Z}_q^\lambda$, i.e. $\mathbf{e}_i =$ (Sample($\mathbf{g}^T, v_{i_1}, \sigma$), …, Sample($\mathbf{g}^T, v_{i_{\lambda/l}}, \sigma$)).

Output the ciphertext $\mathbf{c}_{i,A} = \mathbf{s}_i^T \mathbf{A} + \mathbf{e}_i^T \in \mathbb{Z}_q^\lambda$.

- $\sum_{i=1}^{N} x_i \leftarrow$ AggrDec($\{\mathbf{A}, \mathbf{g}^T\}, (sk_{A_1}, sk_{A_2}), \{\mathbf{c}_{1,A}, \ldots, \mathbf{c}_{N,A}\}$): Receiving the users' ciphertexts $\{\mathbf{c}_i\}$ the aggregator computes $\mathbf{c} = \sum_{i=1}^{N} \mathbf{c}_{i,A}$.
  - Compute $\mathbf{e} = \sum_{i=1}^{N} \mathbf{e}_i^T = \mathbf{c} + sk_{A_1}^T \mathbf{A}$.

The aggregator retrieves the noisy sum of the users' values via
  $$\sum_{i=1}^{N} x_i = \text{AHOM.Dec}(sk_{A_2}, \mathbf{G} \cdot \mathbf{e} \mod q),$$
  where $\mathbf{G} = \mathbf{I}_{\lambda/l} \otimes \mathbf{g}^T \in \mathbb{Z}_q^{\lambda/l \times \lambda}$.

FIG. 6

*Definition 13 (LaPS using DLap and BGV):* Let $\kappa$ be a security parameter, $N \in \mathbb{N}$ the number of participants, $\gamma$ the fraction of uncompromised users and let $\varsigma > 1$ and $\alpha \in (0,1)$. Fix the rings $R_p$, $R_{int}$ and $R_{ext}$ with the corresponding parameters $p, p_0, p_1, q_0, q_1, m, m', l$ as described above. Let $\kappa = \phi(m)/l$.

- $(\{a, \mathbf{g}^T, pk\}, \{s_i\}, (sk_{A_1}, sk_{A_2})) \leftarrow \text{Setup}(1^\kappa)$: Generate the public parameters $a$, $\mathbf{g}^T$ and $pk$ as follows and distribute them to all parties.
  1) Draw $a$ uniformly at random from $R_{ext}$.
  2) Set vector $\mathbf{g}^T = (1, 2, \ldots, 2^{l-1}) \in \mathbb{Z}_{q_1}^l$.
  3) Generate $((\bar{a}, \bar{b}), \bar{s}) \leftarrow \text{BGV.Gen}$ and extract public key $pk$ as $pk = (\bar{a}, \bar{b}) \in R_{int} \times R_{int}$.
  4) For all $i \in \{1, \ldots, N\}$ draw $s_i \leftarrow R_{ext}$ and send it to user $i$ as her secret key.
  5) The aggregator's secret decryption key is the tuple $(sk_{A_1}, sk_{A_2})$, where
     - $sk_{A_1} = -\sum_{i=1}^{N} s_i$ and
     - $sk_{A_2} = \bar{s} \in ((\bar{a}, \bar{b}), \bar{s}) \leftarrow \text{BGV.Gen} \in R_{int}$.

- $c_{i,a} \leftarrow \text{NoisyEnc}_i(\{a, \mathbf{g}^T, pk\}, s_i, d_i)$: Each user $i$ takes her data $d_{i,a} \in D$ and adds some noise $r_i$ to it, s.t. $x_i = d_i + r_i \bmod p \in \mathbb{Z}_p$.
  1) $r_i$ is sampled as follows:
     $$r_i = \begin{cases} 0 & \text{with probability } 1 - \beta \\ Y & \text{with probability } \beta \end{cases}$$
     where $Y \leftarrow DLap_\varsigma$ and $\beta = \frac{1}{\gamma N} \log(\frac{1}{\delta})$.
  2) Set $\bar{x}_i = z2R_{p,m'}(x_i) \in R_p$ and compute $\bar{c} = (\bar{c}_0, \bar{c}_1) \leftarrow \text{BGV.Enc}(pk, \bar{x}_i)$.
  3) Set $\mathbf{v}_i = (R2Z_{q_1,m'}(\bar{c}_0) \| R2Z_{q_1,m'}(\bar{c}_1)) \in \mathbb{Z}_{q_1}^{2 \cdot \phi(m')}$.
  4) Invoke Algorithm 1 for each component of $\mathbf{v}_i$ in order to sample $\mathbf{e}_i \leftarrow D_{\Lambda_{\mathbf{v}_i}^\perp(G), \sigma} \in \mathbb{Z}_{q_1}^{2 \cdot \phi(m') \cdot l}$, i.e. $\mathbf{e}_i = (\text{Sample}(\mathbf{g}^T, v_{i_1}, \sigma), \ldots, \text{Sample}(\mathbf{g}^T, v_{i_{2\phi(m')}}, \sigma))$.
  5) Transform to the ring by $e_i = Z2R_{q_1,m}(\mathbf{e}_i)$. Note that since $\phi(m) = 2 \cdot \phi(m') \cdot l$, $e_i \in R_{ext}$.
  6) Output the ciphertext $c_{i,a} = a \cdot s_i + e_i \in R_{ext}$.

- $\sum_{i=1}^{N} x_i \leftarrow \text{AggrDec}(\{a, \mathbf{g}^T\}, (sk_{A_1}, sk_{A_2}), \{c_{1,a}, \ldots, c_{N,a}\})$: Receiving the users' ciphertexts $\{c_{i,a}\}$ the aggregator computes $c = \sum_{i=1}^{N} c_{i,a}$.
  1) Compute $e = \sum_{i=1}^{N} e_i = c + a \cdot sk_{A_1}$.
  2) Set $\mathbf{e} = R2Z_{q_1,m}(e) \in \mathbb{Z}_{q_1}^{\phi(m)}$.
  3) Compute $\mathbf{v} = G \cdot \mathbf{e} \bmod q_1 \in \mathbb{Z}_{q_1}^{2 \cdot \phi(m')}$, where $G = I_{\phi(m)/l} \otimes \mathbf{g}^T \in \mathbb{Z}_{q_1}^{\frac{\phi(m)}{l} \times \phi(m)}$.
     Again, note that $\phi(m)/l = 2 \cdot \phi(m')$ and that $\mathbf{v}$ is the sum of the individual $\mathbf{v}_i$'s from $\text{NoisyEnc}_i$.
  4) Parse $\mathbf{v}$ as a tuple of vectors $\mathbf{v} = (\mathbf{v}', \mathbf{v}'') \in \mathbb{Z}_{q_1}^{\phi(m')} \times \mathbb{Z}_{q_1}^{\phi(m')}$.
  5) Decrypt $\bar{x} = \text{BGV.Dec}(sk_{A_2}, (Z2R(\mathbf{v}'), Z2R(\mathbf{v}''))) \in R_p$. Note that $\bar{x}$ is the sum of the individual $\bar{x}_i$'s from $\text{NoisyEnc}_i$.
  6) The aggregator retrieves the noisy sum of the users' values with $\sum_{i=1}^{N} x_i = R2z_{p,m'}(\bar{x}) \in \mathbb{Z}_p$.

---
ALGORITHM 1: Algorithm Sample to sample from $\Lambda^\perp(\mathbf{g}^T)$
---
Input: $\mathbf{g}^T \in \mathbb{Z}_q^l, w \in \mathbb{Z}_q, r$
Output: $\mathbf{t} = (t_0, \ldots, t_{l-1})^T \in \Lambda_w^\perp(\mathbf{g}^T)$ distributed according to $D_{\Lambda_w^\perp(\mathbf{g}^T), r}$
$a_0 := w$
for $j = 0, \ldots, l-1$ do
$\quad t_j \leftarrow D_{2\mathbb{Z}+a_j, r}$
$\quad a_{j+1} = (a_j - t_j)/2$
end for

POST-QUANTUM SECURE PRIVATE STREAM AGGREGATION

CLAIM OF PRIORITY

This disclosure claims the benefit of U.S. Provisional Application No. 62/508,140, which is entitled "Post-Quantum Secure Private Stream Aggregation," and was filed on May 18, 2017, the entire contents of which are hereby expressly incorporated herein by reference.

FIELD

This disclosure relates generally to the fields of information security, and, more particularly, to systems and methods that generate aggregate data collected from multiple client computing devices while preserving the privacy of the individual data contributions from each of the client computing devices.

BACKGROUND

Unless otherwise indicated herein, the materials described in this section are not prior art to the claims in this disclosure and are not admitted to the prior art by inclusion in this section.

Many complex networked computing systems collect large amounts of data in monitoring processes to track statistical information that is recorded by, for example, distributed sensor networks, automobiles, home appliances, medical information systems, and the like. Of course, one well-known drawback to such large scale data collection is that this data directly or indirectly reveals sensitive information about humans who, for example, are monitored by the sensor networks, drive automobiles, live in homes, and receive medical care.

Many prior-art systems rely on a trusted aggregator, which is a computing system that receives encrypted data from the individual client computing devices, decrypts the data, and produces an aggregated output that includes general statistics for a large number of client computing devices that do not enable outside observers to identify the particular input data from each client computing device that could then be associated with the activities of particular humans. For example, while individual records from medical monitoring devices may identify that an individual patient visited a hospital, the aggregator collects a large number of records from the monitoring devices to produce an output detailing the total number of patients that visited the hospital, which cannot be used to identify an individual patient.

If operated properly, the aggregator provides "differential privacy", which is to say that the output of the PSA system does not enable an observer to determine the individual inputs from clients and corresponding humans who provided individual contributions to the final output. As noted above, most prior-art systems rely on "trusted" aggregators. While the word "trusted" has positive connotations in common usage, in the field of information security the requirement to have a "trusted" aggregator is actually a disadvantage because the aggregator must be trusted to maintain the privacy of data from the individual client devices and corresponding human users. When the aggregator is operated by a third party, such as a corporate or governmental entity, the individuals who operate the client computing devices that transmit information to the aggregator must not only trust the operator of the aggregator, but must further trust that the aggregator is immune to being compromised by unauthorized attackers who would seek to collect private information by compromising the security of the decrypted data that the trusted aggregator processes during operation.

To reduce the privacy concerns described above, private stream aggregation (PSA) systems are known to the art. In a PSA system each client transmits encrypted data (a "stream") to an untrusted aggregator that cannot decrypt the data from each client. The aggregator does not need to be trusted as far as privacy of data from individual clients is concerned. In the PSA system, the client not only transmits the encrypted data, but includes a client-specific secret and random noise in the actual data prior to encryption using a public key that is associated with the aggregator. The untrusted aggregator is not capable of recovering the original plain text data from the encrypted data received from the client. Instead, the aggregator combines multiple encrypted sets of data from different clients together using a homomorphic operation and is only capable of decrypting a combination of all the inputs to produce an aggregate value that is referred to as a "noisy sum" of all the input stream data from the individual clients. The noisy sum is an aggregate piece of information about all of the inputs, such as the total number of hospital visits described above, but the untrusted aggregator never decrypts plaintext data from individual clients and cannot determine the specific contribution of each encrypted client stream to the final output, such as determining that a particular person actually visited the hospital. Thus, the PSA system also provides differential privacy as described above with the added advantage that the aggregator system does not have to be trusted in order to provide differential privacy. An example of a prior-art PSA system is described in more detail in a paper by Elaine Shi et al., Privacy-Preserving Aggregation of Time-Series Data, Network and Distributed System Security Symposium (NDSS), 2011.

The prior-art PSA systems have drawbacks related both to practical performance and to future security, however. The first drawback is related to performance. Each transmission of data from a client to the aggregation server can only efficiently contain a single bit (e.g. logical "0" or "1") of information in the message that is sent to the aggregation server. This limitation is due to the use of the discrete logarithm computation as the basis for the homomorphic encryption process, and limits the practical performance of the prior-art PSA system. Thus, the client computing devices cannot communicate large amounts of data to the aggregation server in an efficient manner while also maintaining the security properties of the PSA system.

The second drawback to prior-art PSA systems, and many asymmetric public/private key cryptographic systems generally, is related to the development of quantum computers. A quantum computer relies on the properties of quantum physics related to the entanglement and superposition of particles to enable the efficient computation of certain classes of mathematical problems that cannot be solved "quickly" (in polynomial time) using even the most powerful "classical" computers (i.e. existing commercially available computers). More particularly, one common type of quantum computer implements quantum gates that perform operations on data stored in multiple quantum bits ("qubits"). Unlike traditional memory registers in a classical computer, when operating properly the qubits simultaneously store $2^N$ possible states where N is equal to the number of qubits that are entangled and operate together in the quantum computer via the superposition property of quantum physics. For example, a 16 bit memory register in a standard classical computer stores a single state formed from 16 individual binary values out of a possible $2^{16}$ states. A quantum computer, however, can perform operations on 16 entangled qubits that, at least theoretically, store all $2^{16}$ states simultaneously and enable the quantum gates to perform simultaneous calculations on all $2^{16}$ states. Other forms of quantum computers including those that rely upon quantum annealing and adiabatic quantum computation are also known to the art, although the underlying physical operating principles of these quantum computers may be less effective in attacking existing asymmetric cryptographic systems.

Rudimentary quantum computers are known to the art and these quantum computers, in some instances operating in conjunction with classical computers as used in Shor's algorithm or other algorithms, can provide solutions to simple discrete logarithm problems, prime factorization problems, or other mathematical problems that form the basis for existing asymmetric public/private key cryptography. Existing quantum computers—or at least existing publicly known quantum computers—can only be manufactured to operate with far too few quantum gates and entangled qubits, typically less than 100 qubits, to solve the mathematical problems that could enable an attacker to identify a private key that corresponds to a given public key in existing cryptographic systems. For example, those of skill in the art estimate that a quantum computer with approximately 4,000 qubits and 100 million quantum gates could break 2048-bit RSA or equivalent ElGamal keys in a practical amount of time using Shor's algorithm that employs a combination of the quantum computer with existing classical computers to break the keys. In the 2048-bit key example, a practical quantum computer requires more than 2048 qubits corresponding to the 2048 bit key since additional qubits are required for error correction, and the cited numbers of qubits and quantum gates are only an estimate. While existing quantum computers are not a direct threat to present cryptographic systems, there is a reasonable likelihood that future quantum computers will be manufactured with a sufficient complexity to enable practical attacks on existing asymmetric cryptographic systems including those that rely on the prime factorization and discrete logarithm mathematical problems. Those of skill in the art are aware of the potential threat posed by quantum computers that could be used to recover the private keys in existing asymmetric cryptographic systems that are otherwise resistant to even the most powerful classical computers.

As described above, existing PSA systems have drawbacks related both to performance and potential security issues related to future advances in quantum computers. Consequently, improvements to PSA systems that provide differential privacy to clients while reducing or eliminating these problems to existing systems would be beneficial.

SUMMARY

In one embodiment, a method for operating an aggregator in a private stream aggregation (PSA) system has been developed. The method includes receiving, with a network interface in the aggregator, a plurality of encrypted messages from a plurality of clients, each client in the plurality of clients transmitting one encrypted message in the plurality of encrypted messages, each encrypted message corresponding to a vector in a learning with errors (LWE) public key, adding, with a processor in the aggregator, the plurality of encrypted messages to generate an aggregate data set corresponding to a sum of the plurality of encrypted messages, extracting, with the processor, a summation of a plurality of error vectors in the plurality of encrypted messages from the aggregate data set using a predetermined matrix stored in a memory of the aggregator corresponding to a portion of the LWE public key in each encrypted message and a predetermined secret key stored in the memory, the predetermined secret key corresponding to a sum of a plurality of secret keys used by the plurality of clients to generate the plurality of encrypted messages, multiplying, with the processor, a predetermined gadget matrix stored in the memory with the summation of the plurality of error vectors to generate a summation of encrypted data contained in the plurality of encrypted messages, decrypting, with the processor, the summation of the encrypted data contained in the plurality of encrypted messages using a private key stored in the memory of the aggregator to generate a plaintext sum of noisy data generated by the plurality of clients, and generating, with the processor, an output of the plaintext sum of noisy data that preserves differential privacy of each client in the plurality of clients.

In another embodiment, a method for operating a first client in a private stream aggregation (PSA) system has been developed. The method includes encrypting, with a processor in the first client, noisy plaintext data using a first public key stored in a memory of the first client to generate an encrypted data vector, sampling, with the processor in the first client, the encrypted data vector to generate an error vector with a Gaussian distribution based on the encrypted data vector, generating, with the processor in the first client, a vector of a learning with errors (LWE) public key using a predetermined matrix stored in the memory of the first client, a predetermined secret key stored in the memory of the first client, and the error vector, the LWE public key being different than the first public key, and transmitting, with a network interface in the first client, a first encrypted message including the vector of the LWE public key to an aggregator.

In another embodiment, an aggregator in a private stream aggregation (PSA) system has been developed. The aggregator includes a network interface configured to receive encrypted messages from a data network, a memory, and a processor operatively connected to the network interface and the memory. The memory is configured to store a predetermined matrix corresponding to a portion of a learning with errors (LWE) public key, a predetermined gadget matrix, a predetermined secret key, and a private key. The processor is configured to receive a plurality of encrypted messages from a plurality of clients with the network interface, each client in the plurality of clients transmitting one encrypted message in the plurality of encrypted messages, each encrypted message corresponding to a vector in an LWE public key, add the plurality of encrypted messages to generate an aggregate data set corresponding to a sum of the plurality of encrypted messages, extract a summation of a plurality of error vectors in the plurality of encrypted messages from the aggregate data set using the predetermined matrix stored in the memory corresponding to a portion of the LWE public key in each encrypted message, and the predetermined secret key stored in the memory, the predetermined secret key corresponding to a sum of a plurality of secret keys used by the plurality of clients to generate the plurality of encrypted messages, multiply the predetermined gadget matrix stored in the memory with the summation of the plurality of error vectors to generate a summation of encrypted data contained in the plurality of encrypted messages, decrypt the summation of the encrypted data contained in the plurality of encrypted messages using the private key stored in the memory to generate a plaintext sum of noisy data generated by the plurality of clients, and generate an output of the plaintext sum of noisy data that preserves differential privacy of each client in the plurality of clients.

BRIEF DESCRIPTION OF THE DRAWINGS

FIG. 5A is a table that shows a comparison of the plaintext modulus ranges and the time required for both noisy encryption with each client and the decryption of the aggregate noisy sum with the untrusted aggregator.

FIG. 5B is a depiction of configurations and parameters of the system of FIG. 1 that operate with different numbers of clients and different plaintext modulus ranges.

FIG. 6 is a pseudo-code listing of one embodiment of the process 200.

FIG. 7 is a pseudo-code listing of another embodiment of the process 200.

FIG. 8 is a pseudo-code listing of an algorithm that samples Gaussian random data for use as an error vector in a learning with errors encryption process based on pseudo-random data with a uniform distribution produced by a public inner encryption key in the process 200.

DETAILED DESCRIPTION

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the terms "homomorphism" and "homomorphic" refer to a property of some cryptographic systems that enables a computerize system to perform operations using encrypted ciphertext data that produces a plaintext result, after decryption, that matches the results of the same operations if applied to the plaintext data. For example, cryptographic systems that provide additive homomorphism are described herein that enable a computer to add two ciphertexts a and b together to produce a third ciphertext c. The third ciphertext c, when decrypted, produces a plaintext value that matches the sums of the plaintext data that are encrypted in a and b. For example, if a and b are a ciphertexts that encrypt the values 2 and 3, respectively, then the ciphertext c, when decrypted, produces the value 5 (2+3=5). A computer that receives the original ciphertexts a and b can produce the ciphertext c via direct addition of the original ciphertexts without ever decrypting either of the original encrypted inputs a and b, or requiring access to any cryptographic key. Some, but not all, cryptographic systems provide homomorphic properties, and the embodiments described herein employ cryptographic systems that provide additive homomorphism as described above and optionally other homomorphic properties.

The embodiments described herein use a modified version of a Learning with Errors (LWE) asymmetric cryptographic system. LWE is a form of lattice-based cryptography that uses a mathematical lattice as the basis for cryptographic primitives that produce a public key and a private key in an asymmetric cryptographic system. More broadly, a reference to LWE cryptography refers to a class of cryptographic systems that rely on the underlying lattice mathematics problems known to the art, such as the shortest vector problem (SVP), to implement an asymmetric cryptographic system with public and private keys. References to LWE cryptographic systems further include "ring LWE" cryptographic systems that are known to the art.

Figure 9:
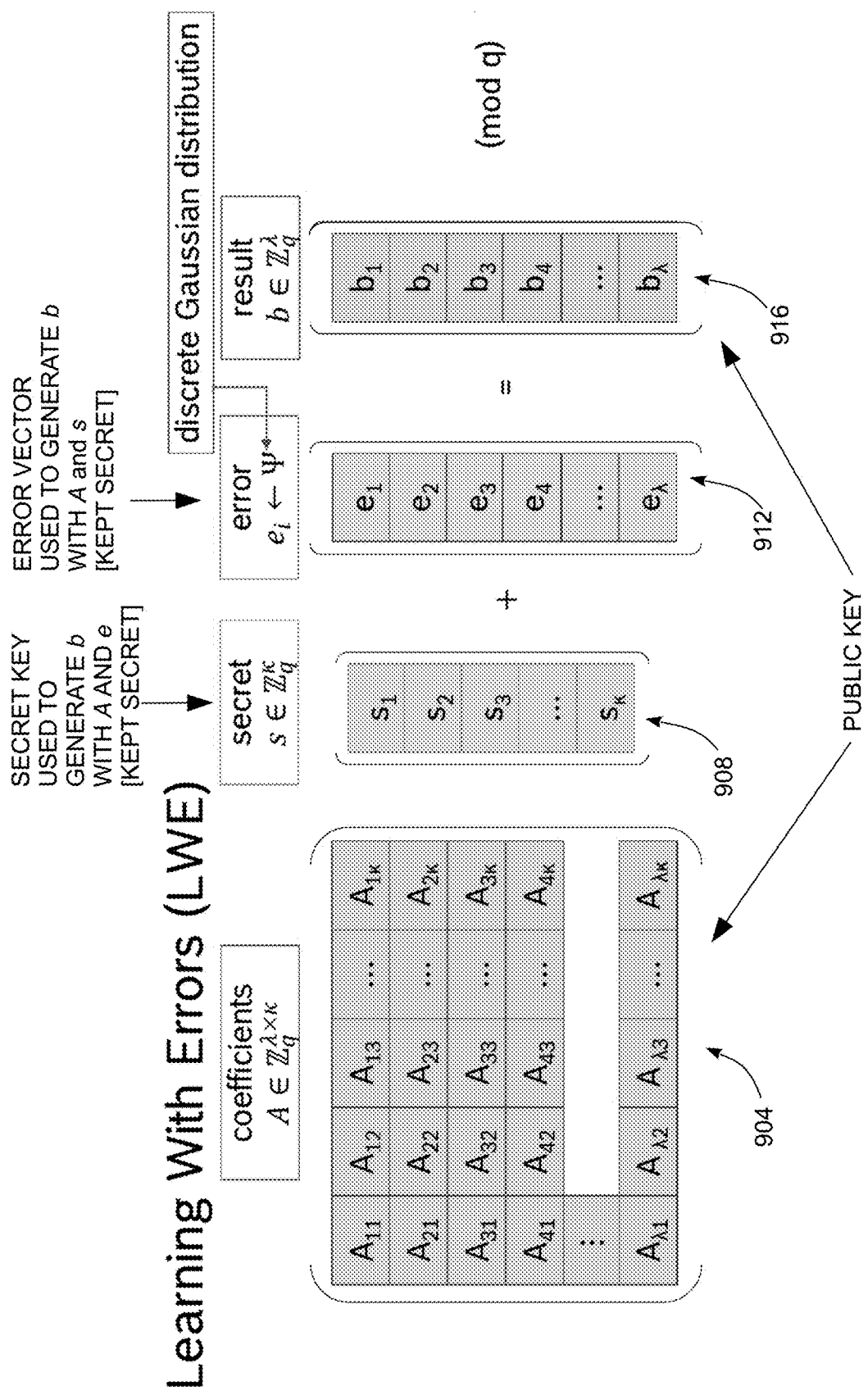
FIG. 9 is a diagram depicting a prior-art learning with errors (LWE) key generation process.

FIG. 9 is a diagram that depicts a simplified prior-art key generation process that produces a public/private key pair that can be used with an LWE cryptographic system. In FIG. 9, the LWE public key is a two-part key that includes a matrix A 904 and a vector b 916, which are both made publicly available. In FIG. 9, the LWE private key includes a vector of secret data s 908, which is kept secret. The error vector e 912 is also kept secret but is not generally considered to be part of the private key, The matrix A 904 is a two-dimensional matrix of coefficient values arranged into $\lambda$ rows and $\kappa$ columns. As depicted in FIG. 9, all of the numeric values are selected from an integer ring $\mathbb{Z}$ where the two-dimensional matrix A 904 is an element of $\mathbb{Z}_g^{\lambda \times \kappa}$, the secret data s 908 is an element of $\mathbb{Z}_q^{\kappa}$, and the error terms in the error vector e 912 and the public key output vector b 916 are elements of $\mathbb{Z}_q^{\lambda}$ where q represents a modulus of the integer ring. A non-limiting practical example of $\kappa$, and q that can be used in existing LWE cryptographic systems is: $\kappa=320$, and $q \approx 2^{12}$. This can be used as the basis for an LWE-based PSA system. In the PSA system described herein examples of parameter configurations for 80-bit and 128-bit security are shown in FIG. 5B.

In the matrix A 904, each of the coefficients $A_{\lambda,\kappa}$ is selected randomly within the range of the integer ring $\mathbb{Z}_q$ based on the output of a cryptographically secure random number generator or pseudo-random number generator that produces an output with a uniform random distribution. In isolation, the contents of the matrix A are not related to the secret data s 912 or the error vector e. Similarly, each of the coefficients in the secret key s 908 is selected randomly within the range of the integer ring $\mathbb{Z}_q$ based on the output of a cryptographically secure random number generator or pseudo-random number generator that produces an output with a uniform random distribution, and the contents of the secret key s 908 are not directly related to A or to the error vector e. To form a public/private key pair that links the matrix A 904 and the secret key data s 908 together, the LWE key generation process performs a matrix multiplication of As to form part of the final output for the vector b 916. However, by itself the product As could easily reveal s using basic matrix manipulations that are performed using an ordinary classical computer that is assumed to have access to the full public key including the vector b 916 and the matrix A 904. To prevent this attack, the LWE key generation process uses a random number generator to produce $\lambda$ error terms in an error vector e 912 within the range of the integer ring $\mathbb{Z}_q$ where the error terms are selected using a Gaussian random distribution Ψ. In the prior-art LWE embodiment of FIG. 9, a cryptographically secure random or pseudo-random number generator is used to generate the error values the error vector 912 to ensure that an external attacker cannot effectively guess the contents of the error vector e. The error vector e is added to the output of As to produce the final output b 916, which is a vector with λ elements. The matrix A 904 and the vector b 916 form the final public key that is available to all parties, including attackers, in a standard LWE cryptographic system. The secret key s 908 forms the private key that is not revealed to the public and is only accessible by trusted devices in the LWE cryptographic system.

A properly configured LWE cryptographic system is believed to be resistant to mathematical attacks by both powerful classical computers and quantum computers, including quantum computers with capabilities that greatly exceed the present art. Thus, a properly configured LWE cryptographic system is said to be a "post-quantum" cryptographic system. The resistance to mathematical attacks generally means that an attacker with even a powerful quantum computer or combination of quantum and classical computers cannot determine the LWE private key in polynomial time when provided with the LWE public key and any other pieces of information that enable known or chosen plaintext attacks (KPA/CPA), and chosen ciphertext attacks (CCA). Thus, an LWE cryptographic system can provide resistance to classical and quantum computational attacks in which the attacker is provided access to the public key. However, an attacker can still compromise an individual LWE public/private key pair by retrieving the private LWE key using a traditional non-cryptographic attack, such as defeating access controls of a computer that stores the private LWE key and reading the private LWE key from a memory of the compromised computer.

In addition to the security properties that are described above, the embodiments of LWE cryptographic systems use herein have additive homomorphic properties. As described above, the additive homomorphic properties of the LWE cryptographic system enables a computing device that receives two or more ciphertexts that are each generated using the same public key to add all of the ciphertexts together to produce an encrypted output that, when decrypted, includes a sum of all the plaintext data from the original inputs.

Unlike the standard prior-art LWE key generation process of FIG. 9, the embodiments described herein further use homomorphic properties of the public keys of multiple clients that use a common matrix A and that generate different values of b based on different secret keys and different sets of error data that, instead of being true Gaussian random data, actually include encrypted plaintext data to implement an efficient PSA system. In the context of LWE, the additive homomorphic property extends to the error data that are included in each of public key vectors b. Consequently, given multiple public key vectors $b_1, b_2 \ldots b_n$ that are generated using the same matrix A but with different secret keys $s_1, s_2, \ldots s_i$, the sum of the public key vectors $\Sigma_{i=1}^n b_i$ includes both the sum of all of the secret keys multiplied by A: $(A\Sigma_{i=1}^n s_i)$ and a sum of all the error vectors $\Sigma_{i=1}^n e_i$, which are each simply added to $As_i$ to produce each public key vector $b_i$ as depicted in FIG. 9. Thus, the summation of $\Sigma_{i=1}^n b_i$ also includes the summation of the plurality of error vectors $\Sigma_{i=1}^n e_i$ that can be extracted from a sum of the public key vectors $\Sigma_{i=1}^n b_i$ using the techniques that are described herein as part of a PSA system.

Figure 1:
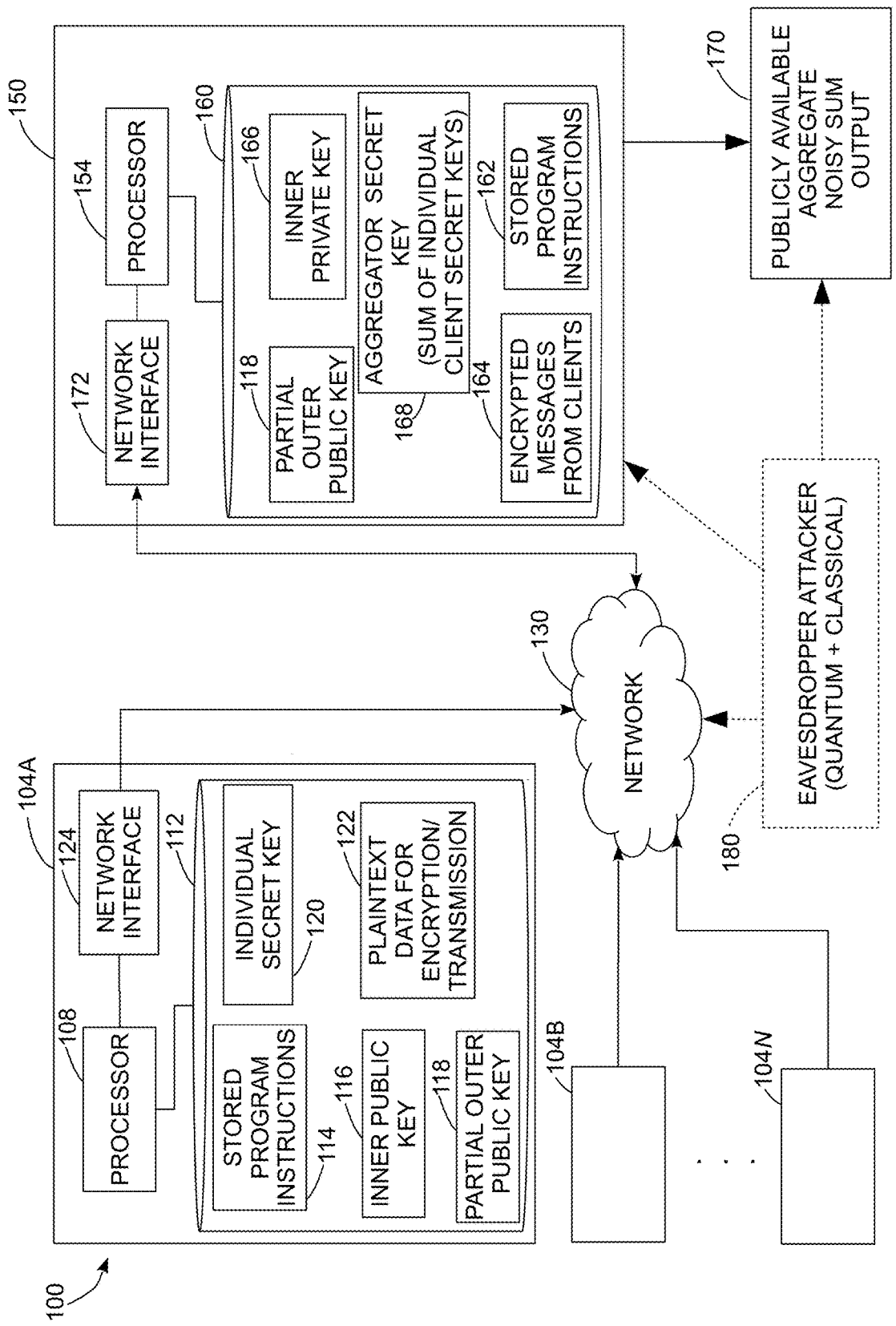
FIG. 1 is a schematic diagram of a system including a plurality of clients and an untrusted aggregator that performs private stream aggregation (PSA) using the methods described herein.

FIG. 1 depicts a system 100 that implements private stream aggregation (PSA) that enables multiple client computing devices to transmit encrypted data to an untrusted aggregator server with substantially greater efficiency than prior-art PSA systems while also preserving the privacy of individual encrypted messages against attackers that may employ advanced quantum computers. The system 100 includes a plurality of clients 104A-104N that are communicatively connected to an untrusted aggregator 150 using a data network 130. FIG. 1 also depicts an attacker 180 that is not part of the system 100. The attacker 180 attempts to compromise the privacy of information that the clients 104A-104N transmit to the aggregator 150 in general, and, in particular, the attacker 180 attempts to compromise the differential privacy of the output of the aggregator 150 to identify the contributions of the individual clients 104A-104N to the final output from the aggregator 150.

FIG. 1 depicts the client 104A in greater detail including a processor 108, network interface 124, and a memory 112. The processor 108 is a digital logic device that includes one or more of a microprocessor, microcontroller, digital signal processor (DSP), field programmable gate array (FPGA), application specific integrated circuit (ASIC), and any other suitable digital logic devices. The processor 108 optionally includes a hardware random number generator that can generate random data that is considered to be cryptographically secure. In some embodiments the processor 108 is implemented using multiple discrete devices while in other embodiments the processor 108 is implemented as a System on a Chip (SoC) device. The processor 108 is operatively connected to the memory 112 and the network interface 124.

In the client 104A, the memory 112 is a digital data storage device that typically includes a volatile memory such as static or dynamic random access memory (RAM) and a non-volatile data storage device such as a magnetic disk or solid state data storage device. The memory 112 stores programmed instructions 114 for execution by the processor 108, a first public key that is referred to as the inner public key 116, a second partial public key that is referred to as the partial outer public key 118, a predetermined secret key 120 that is generated individually for each of the clients, and the plaintext data 122 that the client 104A encrypts and transmits to the aggregator 150 as part of a PSA process using the methods described herein.

During operation, the client 104A uses the inner public key 116 to generate an encrypted representation of plaintext data 122 with added noise. As described in more detail below, the client 104A generates an error vector that is indistinguishable from a random Gaussian noise distribution based on the encrypted data generated using the inner public key. The client uses the partial outer public key 118, which is equivalent to the matrix A shown above, with the individual secret key 120 and the specially generated error vector to produce an output vector b that forms the rest of a public key that is then transmitted to the untrusted aggregator 150. Thus, the client 104A generates the vector b that is part of an LWE public key where the vector b also contains an encrypted representation of the plaintext data 122 in the error vector data e.

In the embodiment of the system 100, both the inner public key 116 and the partial outer public key 118 are generated for use in an LWE cryptographic system that has additive homomorphic properties with one specific example being the Brakerski-Gentry-Vaikuntanathan (BGV) homomorphic LWE cryptographic system. In addition to homomorphism, the BGV cryptographic system provides two useful properties that the system 100 uses to implement PSA. First, BGV generates ciphertexts that can be used as the error vectors as described above with reference to FIG. 9, which enables each client 104 to encode larger amounts of information into the output public key vector b based on the size of the error vector compared to traditional PSA systems. Second, each of the clients 104A-104N uses the partial outer public key 118, secret key 120, and the specially generated error vector data that encrypts the plaintext data 122 to generate the output vector b that cannot be decrypted by either of the aggregator 150 or an attacker 180 that has access to a quantum computer. In another embodiment, the system 100 can use a different homomorphic cryptographic system for the inner public key 116 and the corresponding inner private key 166 that is stored in the aggregator 150, even if the cryptographic system is susceptible to a mathematical attack by a quantum computer or to a more straightforward disclosure of the inner private key 166 to the attacker, because the system 100 preserves confidentiality and differential privacy in a PSA process even if the inner private key 166 is revealed to the attacker 180.

As described above, the secret key 120 in the memory 112 of the client 104A is a randomly generated vector that is kept secret from the aggregator 150 and the attacker 180. The individual secret keys 120 in the client 104A and the other clients 104B-104N when added together have an absolute value that is equal to the value of an aggregator secret key 168 that is stored in the memory 160 of the aggregator 150. As described below, the aggregator 150 has a priori knowledge that the plaintext sum of all the secret keys 120 from the clients 104A-104N is equal to the aggregator secret key 168, which enables the aggregator 150 to extract a sum of the error vectors for all of the transmitted messages from the clients 104A-104N. The aggregator 150 and the attacker 180 do not have knowledge of the individual secret key 120 in each of the clients 104A-104N or the ability to retrieve any of the individual secret keys 120 based on observable transmitted data from the clients 104A 104N.

The clients 104A-104N possess sensitive plaintext data 122 and the PSA provides a means to publish the data aggregate while preserving differential privacy of the individual clients. To serve as a non-limiting practical example, in this disclosure each of the clients 104A-104N is integrated into a different motor vehicle in a fleet of motor vehicles. Each client collects plaintext data 122 that records the distance traveled by one of the motor vehicles, and the PSA system generates an aggregate noisy sum output of how far all of the vehicles that incorporate the clients 104A-104N have traveled without revealing how far an individual vehicle has traveled. This enables analysis of the operation of a fleet of vehicles without compromising the privacy of an individual vehicle owner.

In the client 104A, the network device 124 uses a wired or wireless network transceiver that enables the client 104A to transmit encrypted data through the network 130 to the aggregator 150. In the system 100, the network 130 is a local area network (LAN) a wide area network (WAN) or a combination of LAN and WAN networks that provides a communication channel between the clients 104A-104N and the aggregator 150. Examples of wired network transceivers include Ethernet network interface devices and examples of wireless transceivers include wireless LAN (WLAN) devices, such as a wireless network interface using Bluetooth or the 802.11 family of protocols, and wireless WAN (WWAN) devices, such as an LTE or "4G", "5G", or similar wireless network interface devices.

While FIG. 1 depicts the system 100 with the client 104A in detail, each of the other clients 104B-104N includes a similar hardware and software configuration. In particular, each of the clients stores the same inner public key 116 and the same partial outer public key 118, but the individual secret key 120 is generated randomly and independently for each client. Additionally, each client typically generates different plaintext data 122 that each of the clients 104A-104N encrypts and transmits to the aggregator 150.

In the system 100 of FIG. 1, the untrusted aggregator 150 is a server computing device that includes a processor 154, memory 160, and a network interface 172. The hardware embodiments of the processor 154, memory 160, and the network interface 172 in the aggregator 150 are similar in structure to the processor 108, memory 112, and network interface 124, respectively, in the client 104A. However, in some embodiments the aggregator 150 includes a processor 154 with higher processing power than the processor 108 and the memory 160 may have a larger capacity than the memory device 112 since the aggregator 150 may be implemented as, for example, a commercial server with substantially greater computing power than the client devices 104A-104N. Like the clients 104A-104N, the aggregator 150 is also a classical computer. As described herein, the aggregator 150 is an "untrusted" computing device because even if the attacker 180 can observe the contents of the memory 160 and all of the operations that the aggregator 150 performs during a PSA process, the attacker 180 cannot use this information to compromise the differential privacy of individual clients 104A-104N. Thus, the clients 104A-104N does not need to trust the aggregator 150.

In the aggregator 150, the memory 160 stores a copy of the partial outer public key 118 that is also stored in the memory of each client, stored program instructions 162, encrypted message data 164 for the private streams including an encrypted message received from each of the clients 104A-104N, an inner private key 166 that corresponds to the inner public key 116 used by the clients 104A-104N, and a set of predetermined aggregator secret key 168. The inner public key 116 and the inner private key 166 are the public/private keys, respectively, in a single key pair of a homomorphic cryptographic system, which is an LWE cryptographic system in some embodiments. The partial outer public key 118, however, is not paired with either of the inner public key 116 or the inner private key 166. In the system 100, the ciphertext 164 corresponds to the public key vectors b that the clients 104A-104N generate and transmit to the aggregator 150. The vector b forms a part of a public key in an LWE cryptographic system while the partial outer public key 118 includes the matrix A in the other part of the public key. Normally a public key is not considered to store "encrypted" data. However, the system 100 and the processes described herein encode encrypted data into the error vector e that forms part of the public key vector b, so each public key vector b that the clients 104A-104N transmit to the aggregator 150 is referred to as an encrypted message in the context of the system 100 and the processes described herein.

In the memory 160, the aggregator secret key 168 has an absolute value that is equal to a sum of all of the individual secret key 120 stored in the clients 104A-104N and this aggregator secret key 168 is used to effectively provide the aggregator 150 with a priori knowledge of the sum of all the secret keys 120 in the clients 104A-104N that transmit the encrypted messages 164. Thus, the aggregator 150 stores the sum of all the secret keys $s_i$ that the clients 104A-104N use to generate the public key vectors $b_i$, even though the aggregator 150 cannot identify individual secret keys for any of the clients 104A-104N. The aggregator 150 uses the partial public key 118 and the aggregator secret key 168 to extract a summation of the error vectors from the summation of the encrypted messages 164 as described below.

During operation, the aggregator 150 decrypts the summation of the encrypted data aggregate data that are encoded into the error vectors of encrypted message data 164, and generates a publicly available aggregate output 170 based on the decrypted aggregate data. Using the example in which the clients 104A-104N transmit encrypted data corresponding to the distance driven by different motor vehicles, the aggregator 150 generates the aggregated output 170 including a noisy sum of the mileage for all of the vehicles. This noisy sum is generally not the exact sum of the actual mileage of the vehicles because each of the clients 104A-104N adds noise data to the original plaintext data 122 to further enhance differential privacy.

In the system 100, the secret key 120 in each of the clients 104A-104N is generated prior to the PSA process described herein, and the untrusted aggregator 150 also receives the aggregator secret key 168 that corresponds to the sum of all the secret keys 120 in the clients 104A-104N prior to the PSA process. In one embodiment, the clients 104A-104N perform a multi-party computation (MPC) process that enables each of the clients 104A-104N to each generate a secret key 120 that is not known to any of the other clients 104A-104N and to generate the sum of the secret keys 120 that forms the aggregator secret key 168, which is transmitted to the untrusted aggregator 150. The MPC process enables the clients 104A-104N to generate secret key data 120 that is not revealed to the aggregator 150, the attacker 180, or to any of the other clients 104A-104N other than the client that generates each secret key 120.

In another embodiment, the secret keys 120 for the clients 104A-104N are generated by an external trusted computer that distributes the individual secret key 120 to each of the clients 104A-104N without revealing the secret data to the attacker 180 or the aggregator 150 prior to starting the PSA process (the untrusted aggregator 150 is not the external trusted computer). The trusted computer also transmits the sum of all the individual secret keys 120 to the aggregator 150 and the sum is the aggregator secret key 168. The trusted external computer is also referred to as a "trusted third party".

In the example of FIG. 1, the attacker 180 is an eavesdropper computing system that includes both an advanced quantum computing system with sufficient capabilities to perform effective attacks on traditional asymmetric cryptographic systems such as ElGamal and RSA as described above, and a high-performance classical computer (e.g. capable of performing $10^{18}$ operations per second or greater). The attacker 180 is assumed to be able to eavesdrop on communications that pass through the network 130 including the ability to record all encrypted messages sent from the clients 104A-104N to the aggregator 150 and to identify the particular client that transmitted each encrypted message. Furthermore, the attacker 180 is assumed to be able to receive the publicly available aggregate stream output data 170. In at least some situations, the attacker 180 is further assumed to have compromised the security of the aggregator 150 and can read any and all information that is stored in the aggregator memory 160 including the inner private key 166.

The attacker 180 is assumed to not have access to the data stored in the memory 112 of each of the clients 104A-104N, which could defeat the PSA schemes described herein by providing the attacker 180 with direct access to the original plaintext data 122. However, even if the attacker 180 can compromise the privacy of some of the individual clients 104A-104N, the system 100 still provides at least some level of differential privacy to the remaining clients. For example, in a configuration that includes 1,000 clients, if the attacker 180 compromises one client, then the system 100 still prevents the attacker 180 from identifying the individual contributions of the remaining 999 clients to the final output even though the attacker 180 can identify the individual data contribution from the single compromised client.

While this disclosure refers to advanced quantum computers that are not presently known to the art that could be used by the attacker 180, all of the hardware components in the system 100 including the clients 104A-104N and the aggregator 150 are implemented using classical computing hardware that is generally known to the art. Thus, the system 100 can perform PSA with added resistance to advanced quantum computers long before such quantum computers are actually developed while only requiring the system 100 to use classical computing devices.

Figure 2:
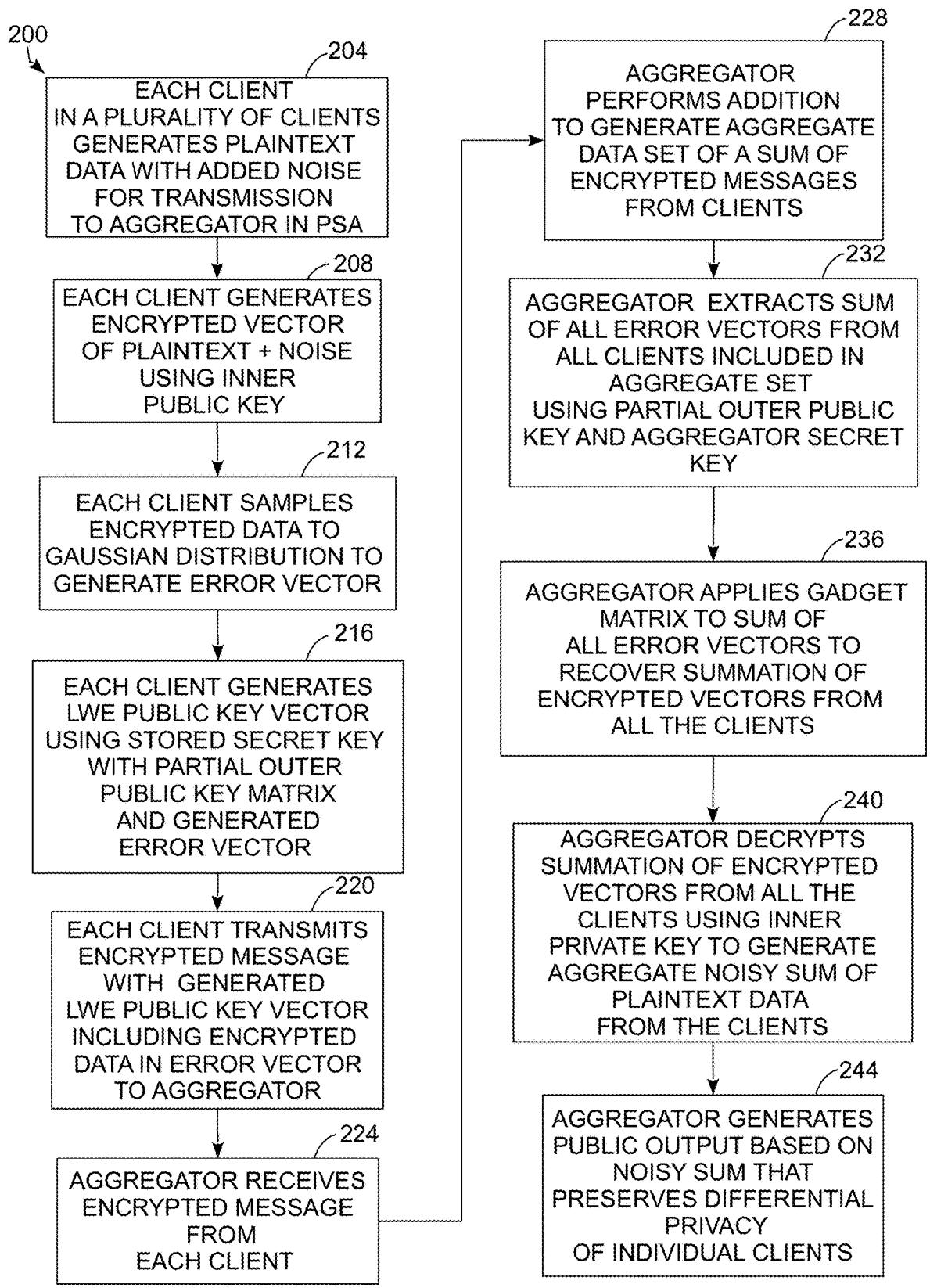
FIG. 2 is a block diagram of a process for performing PSA.

FIG. 2 depicts a process 200 for private stream aggregation (PSA). In the description below, a reference to the process 200 performing a function or action refers to the operation of processors in client computing devices and an untrusted aggregator to execute stored program instructions to perform the function or action. The process 200 is described in conjunction with the system 100 of FIG. 1 and additional diagrams in FIG. 3 and FIG. 4A-FIG. 4B for illustrative purposes.

Figure 3:
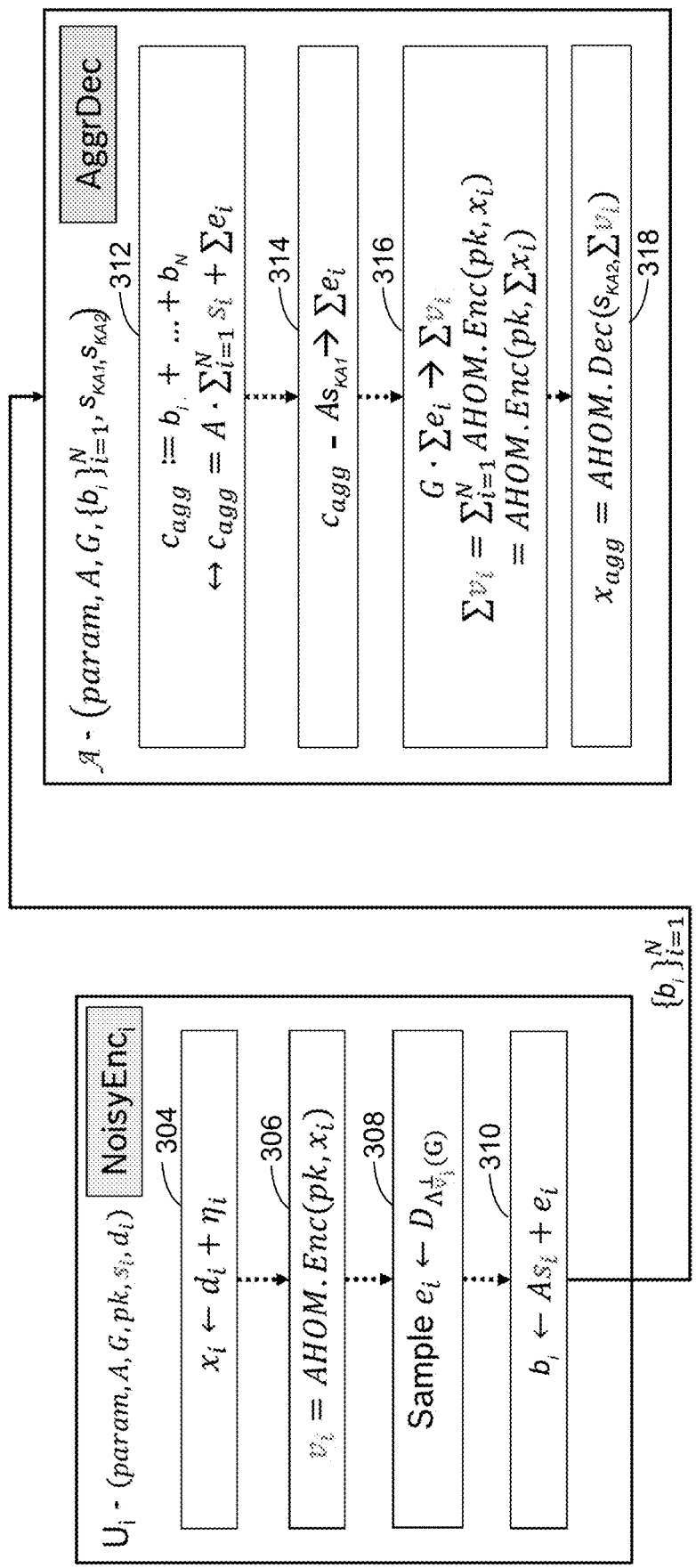
FIG. 3 is a diagram depicting operations in the process 200 of FIG. 2 performed by each of the clients and the untrusted aggregator.

The process 200 begins as each of the clients 104A-104N generates plaintext data with added noise data for transmission to the aggregator in PSA (block 204). Using client 104A as an example, the processor 108 generates the plaintext data 122 during operation of, for example, a motor vehicle that incorporates the client 104A. Using the example described above, one example of the plaintext data 122 is mileage information that records how far the individual motor vehicle has traveled, which the client 104A stores as a multi-bit numerical quantity. The processor 108 also generates random noise data that are added to the plaintext data 122. In the embodiment of FIG. 1 the processor 108 executes the stored program instructions to implement a discrete Laplace mechanism to generate a discrete, randomly generated integer (noise data) that the processor 108 adds to the plaintext data 122. In one embodiment the discrete Laplace mechanism that generates the noise is defined for the function $f: \mathfrak{D}^n \to \mathfrak{R}^k$ as: $\mathcal{M}_{DL}(D, f(\cdot), \in) = f(D) + (Y_1, \ldots, Y_k)$ where $Y_1$ are independently and identically distributed random variables drawn from $DL_\zeta$ where $\zeta = \Delta f / \in$. FIG. 3, block 304, depicts the addition of the plaintext data $d_i$ with the noise term $\eta_i$ to generate a noisy value $x_i$, which is an integer in $\mathbb{Z}_q$, where i represents an index value for each of the clients 104A-104N since each client generates individual sets of plaintext data and noise. The added noise $\eta_i$ preserves the differential privacy of each of the clients 104A-104N.

The process 200 continues as each of the clients 104A-104N generates an encrypted vector of the plaintext with added noise using the inner public key (block 208). In the client 104A, the processor 108 uses the inner public key 116 to encrypt the noisy plaintext data value $x_i$ to generate an encrypted vector $v_i$. FIG. 3, block 306, depicts this operation in more detail where pk is the inner public key 116, and AHOM.Enc is an encryption process that includes at least an additive homomorphic property. The system 100 uses the BGV algorithm as one embodiment of a cryptographic system that has homomorphic properties, including additive homomorphism, to enable the aggregator 150 to add the encrypted messages from all of the clients 104A-104N together and produce an aggregate decrypted output that corresponds to a noisy sum of all the original plaintext data without decrypting any of the individual sets of encrypted data.

The process 200 continues as each of the clients 104A-104N samples the encrypted data ($v_i$) to generate an error vector $e_i$ that is indistinguishable from a Gaussian distributed vector that is produced by the encryption process (block 212). The client 104A applies a sampling algorithm in order to generate the error vector $e_i$. FIG. 3, block 308 and FIG. 8 depict the sampling algorithm in more detail. In particular, the sampling algorithm 800 of FIG. 8 enables recovery of the original encrypted data $v_i$ from the error vector $e_i$ or a sum of multiple sets of encrypted data $\Sigma v_i$ from a sum of error vectors $\Sigma e_i$ using a "gadget matrix" G that is derived from the transpose matrix $g^T$ of FIG. 8 based on the following operation: $G = I \otimes g^T$ where "$\otimes$" is the Kronecker product, $g^T = (1, 2, \ldots 2^{k-1})$. The gadget matrix G is stored in the memory 160 of the aggregator 150 and the values of $g^T$ and G can be publicly known to the system 100 and to the attacker 180. In the system 100, the processor 108 in each of the clients 104A-104N performs the operation of FIG. 8 and, as is described in more detail below, the processor 154 of the aggregator 150 reverses the sampling operation using the sum of error vectors $\Sigma e_i$ to recover the sum of the encrypted vectors $\Sigma v_i$ from all of the clients 104A-104N. As described above, the LWE key generation process uses an error vector that has a Gaussian ($\Psi$) distribution, but the system 100 generates the error vector e to enable each client to include the encrypted data $v_i$ as the Gaussian error vector e in an LWE public key vector b.

The process 200 continues as each of the clients 104A-104N encrypts the encrypted message as a partial LWE public key vector b using the stored secret key 120, the partial outer public key 118, and the previously generated error vector data (block 216). As depicted in FIG. 3, block 310, the processor 108 generates the encrypted message output $b_i$ based on a product of the partial outer public key 118 (A) with the individual secret key 120 ($s_i$) with addition of the error vector $e_i$ that actually contains the ciphertext that represents the true noisy plaintext data of interest.

Figure 4A:
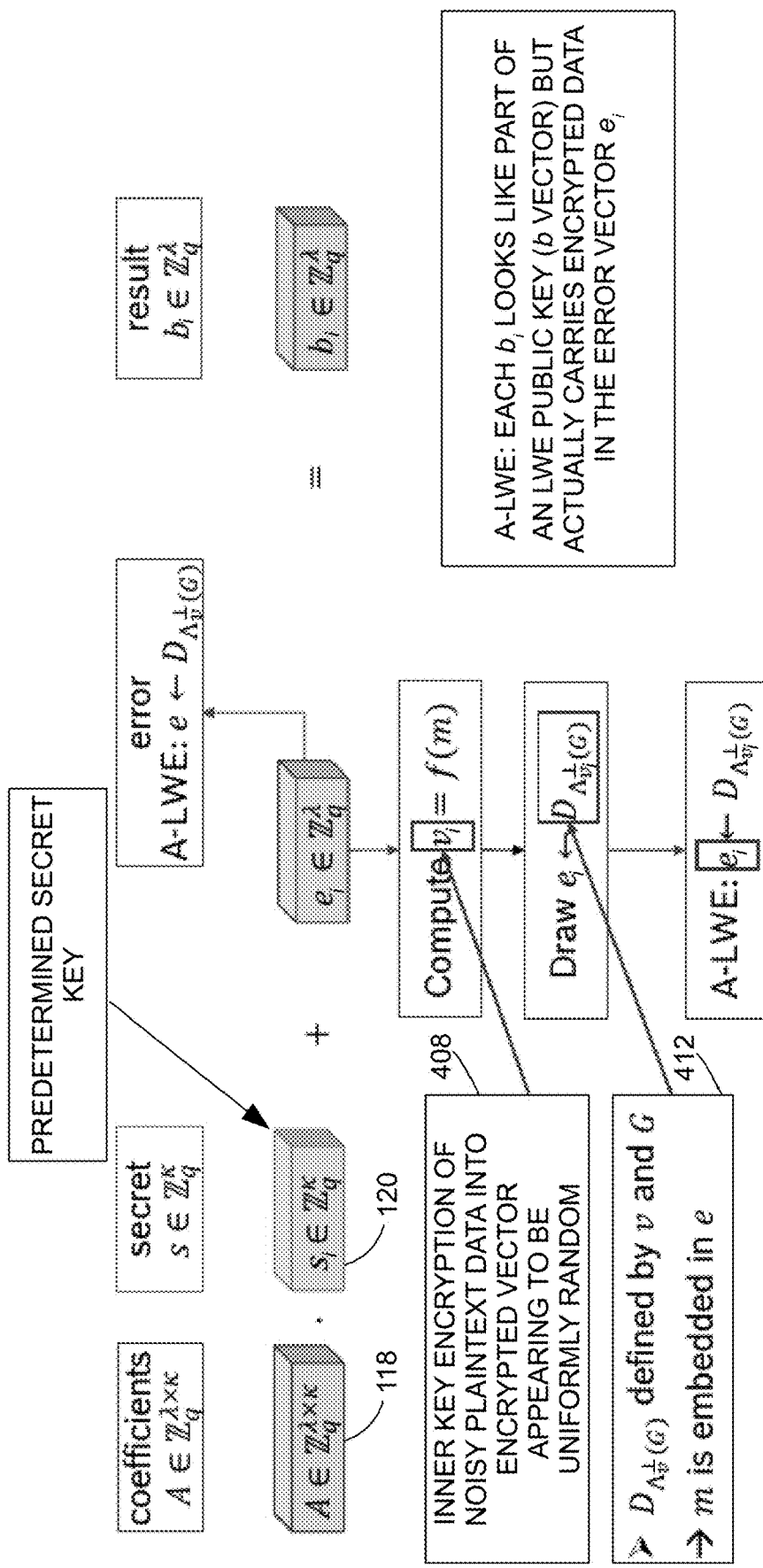
FIG. 4A is a diagram depicting operations of each of the clients in the process 200 of FIG. 2 in more detail.

FIG. 4A depicts additional details of the operations of each of the clients 104A-104N in the process 200. In FIG. 4A, each client uses the inner public key 116 to encrypt the plaintext data 122 (block 408 and block 208 in FIG. 2). The processor 108 then generates the error vector $e_i$ with the distribution $$D_{\Lambda\psi_i^\perp(G)}$$

using the encrypted vector $v_i$ (block 412 and block 212 in FIG. 2). As depicted in FIG. 4A, the processor 108 adds the generated error vector $e_i$, instead of actually random Gaussian errors that are used in a standard LWE cryptographic system, to perform the LWE key generation operation using the partial outer public key A 118, the client secret key $s_i$ 120, and the specially generated error data $e_i$ to generate the LWE public key vector $b_i$ that encodes the encrypted vector $v_i$ of message m in the error vector $e_i$.

Referring again to FIG. 2, the process 200 continues as each of the clients 104A-104N transmits the encrypted message to the aggregator 150 (block 220). In the client 104A, the processor 108 uses the network interface 124 to transmit the encrypted message $b_i$ through the network 130 to the network interface 172 of the aggregator 150. Each of the clients 104A-104N transmits an encrypted message to the aggregator 150 to enable the aggregator to extract a summation of the error vectors in a sum of all the encrypted messages as is described in further detail below. The attacker 180 is assumed to have the ability to record each of the encrypted messages and to identify the particular client that transmitted each encrypted message. However, because the clients employ the modified version of the LWE key generation process using the partial outer public key 118, the attacker 180 is unable to recover the individual secret key $s_i$ or the error data $e_1$ when provided with the matrix A and the vector b in the LWE public key. The post-quantum LWE cryptographic system provides additional resistance to the attacker 180 that has access to a quantum computer.

The process 200 continues as the aggregator 150 receives an encrypted message from each of the clients 104A-104N (block 224) and performs an addition operation to sum the encrypted messages from the clients 104A-104N into an aggregate set of encrypted data (block 228). The processor 154 in the aggregator 150 adds the individual encrypted messages 164 $b_i$ from each of the clients 104A-104N that are stored in the memory 160 to produce the aggregate output $c_{agg}$: $c_{agg} = b_1 + \ldots + b_N$. FIG. 3, block 312, shows this process in more detail. As described above, the LWE cryptographic system provides additive homomorphism. Additive homomorphism means that since each message with the vector $b_i$ from a client contains data corresponding to $As_i + e_i$, then the combined aggregate $c_{agg}$ is: $c_{agg} = b_1 + \ldots + b_N = A\Sigma_{i=1}^{N} s_i + \Sigma_{i=1}^{N} e_i$ where once again A is the matrix that forms the partial outer public key 118, each of the terms $s_i$ is an individual secret key 120 stored in a client, and the encrypted error vectors $e_i$ contain the actual encrypted data messages. Additionally, as described above the predetermined aggregator secret key 168 is equal to the sum of the individual secret keys 120 ($\Sigma_{i=1}^{N} s_i$).

The process 200 continues as the aggregator 150 extracts the summation of the error vectors ($\Sigma_{i=1}^{N} e_i$) from the aggregate encrypted data set $c_{agg}$ using the aggregator secret key 168 and the partial outer public key 118 (block 232). As described above, the actual message content in the encrypted messages is stored in an encrypted form in the error vector of each encrypted message. To extract the error, the aggregator 150 performs the following operation that is also depicted in FIG. 3, block 314: $\Sigma_{i=1}^{N} e_i = c_{agg} - As_{KA1}$ where $s_{KA1}$ is the aggregator secret key 168. The operation $As_{KA1}$ is equivalent to the portion of the LWE key generation process that applies the matrix A (the partial outer public key 118) to the secret key data ($s_{KA1}$). The homomorphic properties of the cryptographic system mean that aggregate sum of the encrypted messages $c_{agg}$ includes the same value as the aggregator secret key 168 ($s_{KA1}$), so the aggregator 150 can recover the sum of the error vectors from all of the clients 104A-104N $\Sigma_{i=1}^{N} e_i$ by subtracting $As_{KA1}$ from $c_{agg}$ (or equivalently generating $As_{KA1}$ as a negative valued vector $-As_{KA1}$ and adding it to $c_{agg}$). This operation does not reveal any of the individual secret keys 120 to the aggregator 150 and this operation does not reveal the encrypted error data $e_i$ for any individual client to the aggregator 150, which can only extract the sum $\Sigma_{i=1}^{N} e_i$.

The homomorphic properties of the cryptographic system and the configuration of the system 100 enable the aggregator 150 to retrieve the sum of the error vectors $\Sigma_{i=1}^{N} e_i$ using the aggregate encrypted data set $c_{agg}$ as an input. Additionally, because each of the clients 104A-104N encrypts the noisy plaintext data with the inner public key 116 using a cryptographic system such as BGV that also has additive homomorphic properties, the sum of the error vectors $\Sigma_{i=1}^{N}e_i$ also contains an encrypted version of a sum of the original noisy plaintext data.

The process 200 continues as the aggregator 150 applies the predetermined gadget matrix G to the sum of the error vector data $\Sigma_{i=1}^{N}e_i$ to recover the sum of the original encrypted vectors $\Sigma v=\Sigma_{i=1}^{N}v_i$ (block 236). The aggregator 150 stores the predetermined gadget matrix G in the memory 160 and the processor 154 uses the gadget matrix to recover the sum of the original encrypted vectors $\Sigma v$. As described above in block 212 of the process 200, each of the clients 104A-104N samples the encrypted vector $v_i$ to generate an error vector that is indistinguishable to a Gaussian distributed vector that can be used with the LWE key generation process. The aggregator 150 reverses the process to recover the summation of the encrypted data $\Sigma v$, which can then be decrypted to determine the plaintext of the aggregate sum of the noisy plaintext data inputs from all of the clients 104A-104N. FIG. 3, block 316 depicts the process of extracting the vector $\Sigma_{i=1}^{N}v_i$ mathematically via matrix multiplication as G $\Sigma_{i=1}^{N}e_i \bmod(q)=\Sigma_{i=1}^{N}v_i$ where G is a predetermined gadget matrix and $q=2^k$ is a modulus value that enables the aggregator 150 to retrieve $\Sigma v$ by multiplying G by $\Sigma_{i=1}^{N}e_i$.

The process 200 continues as the aggregator 150 decrypts the summation of encrypted data $\Sigma v$ from the clients 104A-104N using the inner private key 166 (block 240). The aggregator 150 uses the appropriate decryption process AHOM.Dec for the selected homomorphic cryptographic system. In the embodiments of FIG. 1 and FIG. 2, the processor 154 in the aggregator 150 performs an LWE decryption process using the inner private key 166 to decrypt encrypted summation of data $\Sigma v$, with a specific example of an LWE decryption process being a BGV decryption process. The aggregator 150 decrypts the encrypted summation vector $\Sigma v$ to retrieve a sum $x_{agg}$ of the original noisy plaintext data from all of the clients 104A-104N. Once again, because the system 100 uses the BGV cryptosystem that provides additive homomorphism, the aggregator 150 can use the inner private key 166 to decrypt the summation of the encrypted data $\Sigma v$ to decrypt the value of $x_{agg}$ with the same value as the sums of the noisy plaintext data from the clients 104A-104N. FIG. 3 depicts the decryption in more detail in block 318 where $s_{KA2}$ is the inner private key 166. Using the example in which the clients 104A-104N are computing devices that transmit the distance traveled by vehicles in a fleet of vehicles, the value $x_{agg}$ corresponds to a noisy sum of the total distance driven by all of the cars.

As described above, because the individual clients 104A-104N each introduce noise into the plaintext, the final value of $x_{agg}$ is not necessarily the exact sum of the original plaintext distance information from the clients and $x_{agg}$ is therefore referred to as a "noisy sum". Those of skill in the art will note that even if the attacker 180 obtains the inner private key 166, either via a mathematical attack or by directly reading the inner private key 166 from the memory 160, the attacker 180 is still only able to decrypt the value of $x_{agg}$. Thus, even if the attacker 180 determines the inner private key 166, the system 100 and the process 200 still provide differential privacy by preventing the attacker 180 from determining the individual contributions of any plaintext data $x_i$ from an individual client to the final noisy sum output of $x_{agg}$.

Figure 4B:
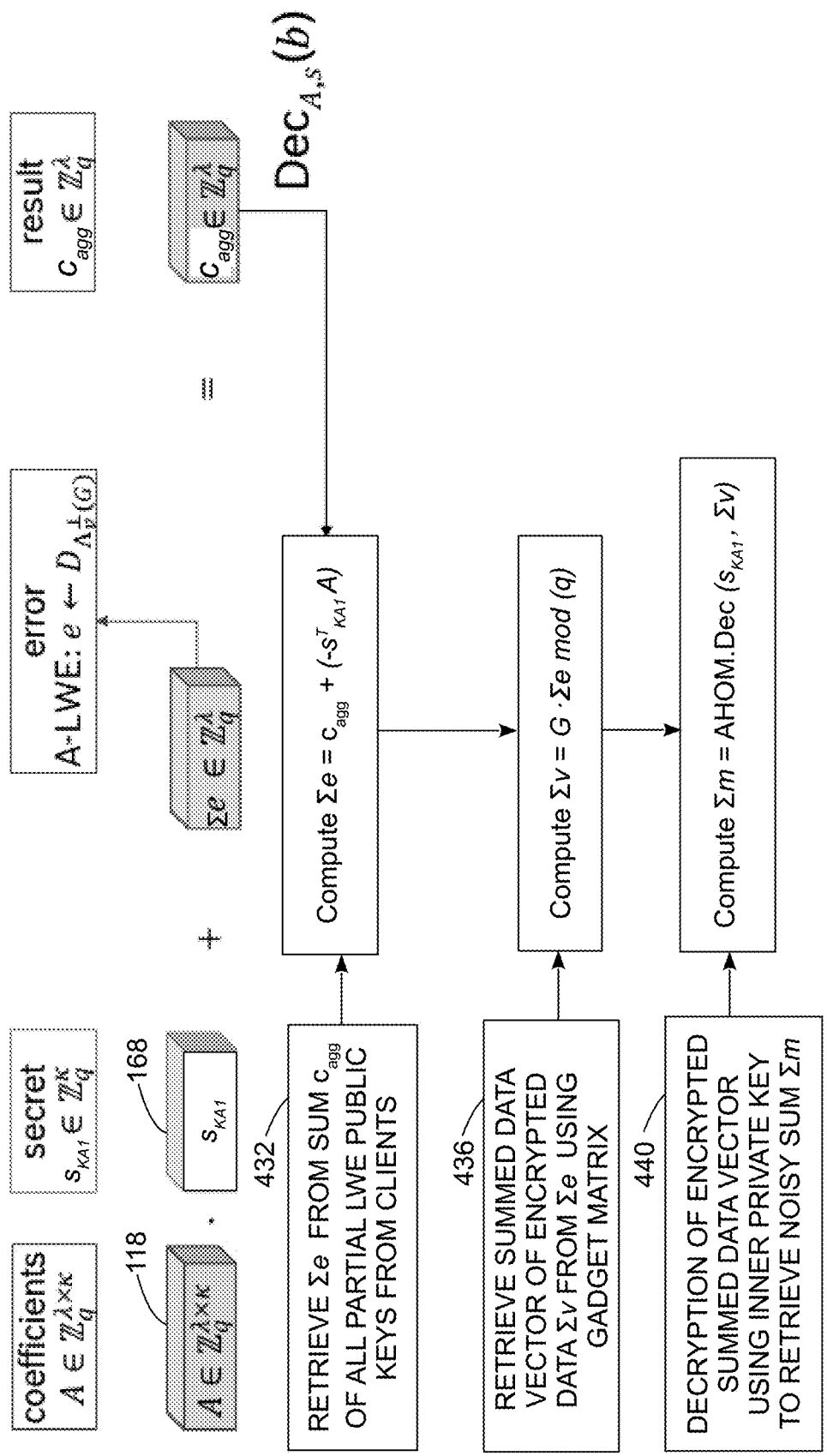
FIG. 4B is a diagram depicting operations of an untrusted aggregator in the process 200 of FIG. 2 in more detail.

FIG. 4B depicts the operation of the aggregator 150 that is described above in more detail. In FIG. 4B, the processor 154 in the aggregator 150 retrieves the sum of the errors $\Sigma e$ by subtracting the transposition $s_{kA_1}^T$ (aggregator secret key 168) multiplied by A (the partial outer public key 118) from the sum of the encrypted messages $c_{agg}$ (block 432 and block 232 in FIG. 2). This process may also be referred to as a form of decryption that enables retrieval the sum of the errors $\Sigma e$. The processor 154 in the aggregator 150 then uses the predetermined gadget matrix G to retrieve the encrypted sum of the vectors $\Sigma v$ that were originally encrypted using the inner public key 116 in each of the clients 104A-104N (block 436 and block 236 in FIG. 2). The gadget matrix G enables the aggregator 150 to retrieve the sum of the encrypted data $\Sigma v$ with a uniform random distribution, which corresponds to the sum of the originally encrypted data vectors $v_i$ before the clients 104A-104N sampled the encrypted data vectors for use as error vectors e in the LWE key generation process. The processor 154 in the aggregator 150 then decrypts the encrypted summed data vector $\Sigma v$ using the inner private key 166 to generate the noisy plaintext sum $\Sigma m$ that is the sum of the noisy plaintext data that each of the clients 104A-104N generated using the discrete Laplace noise added to the original plaintext data 122 (block 440 and FIG. 2 block 240).

Referring again to FIG. 2, the process 200 continues as the aggregator 150 generates a publicly available output based on the decrypted plaintext summation data that preserves the differential privacy of each of the clients 104A-104N that contributed to the final noisy sum output $x_{agg}$ (block 244). As depicted in FIG. 1, the aggregator 150 generates the publicly available noisy sum aggregate output 170 for the users of the system 100 and that can be observed by the attacker 180. In one embodiment, the processor 154 in the aggregator 150 implements a web server that transmits the aggregate noisy sum output 170 using the network interface 172 to web browsers or other software programs that request the data from the aggregator 150 via the network 130. Using the example provided herein, the aggregator 150 generates the aggregate noisy sum output 170 that discloses the noisy sum corresponding to the total distance driven by all of the vehicles that incorporate the clients 104A-104N, but the attacker 180 cannot determine the distance driven by any of the individual vehicles based on the aggregate noisy sum output 170. Alternative embodiments of the aggregator 150 produce the publicly available aggregate noisy sum output 170 using other output techniques that are generally known to the art.

FIG. 2 depicts a single operation of the process 200 in which each of the clients 104A-104N transmits a single message to the untrusted aggregator 150, and the untrusted aggregator 150 generates the publicly available aggregate noisy sum output 170. For additional iterations of the process 200, some embodiments of the system 100 regenerate the partial outer public key 118 to produce a new matrix A' that includes different, randomly generated coefficient values. The use of a different matrix for each iteration of the process 200 ensures that the encrypted messages from the clients 104A-104N appear to be different for each iteration of the process 200 even if some or all of the clients happen to encrypt and transmit the same noisy plaintext data during more than one iteration of the process 200. In one embodiment, the processors 108 in the clients 104A-104N and the processor 154 in the aggregator 150 use a cryptographically secure pseudo-random number generator to produce the coefficient values in each updated matrix A'. The clients 104A-104N and the aggregator 150 use a common seed value for the cryptographically secure pseudo-random number generator, which enables the clients 104A-104N and the aggregator 150 to each generate the new matrix A' with the same coefficients efficiently and without having to transmit data through the network 130. The clients 104A-104N can use the same individual secret keys 120 and the aggregator 150 can use the same aggregator secret key 168 for multiple iterations of the process 200. In general, the system 100 generates new individual secret keys 120 for the clients 104A-104N and a new aggregator secret key 168 when clients are either added to or removed from the system 100.

The process 200 enables each of the clients 104A-104N to send an encrypted numeric value that is generated within a predetermined plaintext numeric modulus p in which different configurations of the system 100 can encode numbers over different ranges while the prior-art PSA system can only encrypt two discrete values (0 or 1) in each message. To set the value of p the system 100 generates encrypted modulus values $q_0$ and $q_1 > p$ such that $q_0 = p_0$ and $q_1 = p_0 \cdot p_1$ for two prime values $p_0$ and $p_1$. These parameters generate the following numeric rings: The plaintext space $$R_p = \left(\frac{\mathbb{Z}}{p\mathbb{Z}}\right)[X] / \Phi_{m'}(X),$$

an internal key and ciphertext space $$R_{int} = \left(\frac{\mathbb{Z}}{q_1\mathbb{Z}}\right)[X] / \Phi_{m'}(X),$$

and the external key and ciphertext space $$R_{ext} = \left(\frac{\mathbb{Z}}{q_1\mathbb{Z}}\right)[X] / \Phi_m(X).$$

As described above, the system 100 generates the internal ciphertexts using the inner public key 116 and the external ciphertexts using the partial outer public key 118, the secret key 120, and the error vector e to produce the LWE public key vector b. The term m' is set equal to a power of two and p s.t. mod m'≡1, then the degree of $R_p$ and $R_{int}$ is $$\phi(m') = \frac{m'}{2} \cdot R_{int}$$

and $R_{ext}$ are identical except for the dimension m' or m: $\phi(m)$ s.t. $\phi(m) = 2 \cdot \phi(m') \cdot l$, where $l = \lceil \log(q_1) \rceil$.

At least one embodiment of the system 100 uses the following mappings to enable operation with the sampling algorithm 800 of FIG. 8:
  a. $z2R_{q,m}: \mathbb{Z}_q \to R_q$: takes a scalar x over the q-ary field and produces the vector $y=(x, 0, \ldots, 0)$ of dimension $\phi(m)$, where y is a coefficient representation of the output ring element.
  b. $R2z_{q,m} \: 2R_{q,m}: R_q \to \mathbb{Z}_q$: takes a ring element and outputs the first element of its coefficient representation.
  c. $R2z_{q,m} 2R_{q,m}: R_q \to \mathbb{Z}_q^{\phi(m)}$: outputs a vector of size $\phi(m)$ by copying the entries of the coefficient representation of the input ring element.
  d. $Z2R_{q,m}: \mathbb{Z}_q^{\phi(m)} \to R_q$: interprets the input vector as the coefficient representation of a polynomial in $R_q$ and outputs the corresponding ring element.

The process 200 described above is also depicted in more detail in the pseudo-code listing 600 of FIG. 6 and the pseudo-code listing 700 of FIG. 7. FIG. 6 depicts a more general implementation of the process 200 that uses homomorphic cryptographic systems and an LWE cryptographic system, but that is not tied to a specific implementation of a cryptographic system. FIG. 7 depicts a more specific implementation of the process 200 that uses the BGV cryptographic system, which is a type of LWE cryptographic system that provides additive homomorphism as described above. FIG. 7 also includes more details about the embodiment of the process 200 described above in which the clients 104A-104N add discrete Laplace noise to the plaintext data prior to encryption with the inner public key 116. Both of these listings also reference using (Algorithm 1) 800 of FIG. 8 to generate the error vector for LWE key generation from the encrypted plaintext data.

As described above, the system 100 and process 200 implement PSA that preserves the differential privacy of encrypted data sent from the clients 104A-104N to the untrusted aggregator 150 even in the presence of the attacker 180 that has access to a quantum computer. Additionally, the system 100 and the process 200 enable substantial improvements to the efficiency of data transmission between the clients 104A-104N and the aggregator 150 because the error vector e in each of the messages that are encrypted with an LWE public key includes multiple elements (2 elements) that can encode more information than the single-bit that can be included in each message using prior-art PSA systems.

FIG. 5A depicts a table 500 that shows a comparison of the plaintext modulus ranges (p) and the time required for both noisy encryption with each client (NoisyEnc$_i$) and the decryption of the aggregate noisy sum with the untrusted aggregator (AggrDec). The results depicted in FIG. 5A were obtained using a commercially available computing device (a notebook computer using a commercially available Intel i7 CPU with a clock speed of 2.5 GHz) to implement both the noisy encryption and decryption operations for illustrative purposes in a PSA system that includes N=1,000 clients. The prior-art PSA can encode a single message using only $p \in \{0, 1\}$ (a single bit). However, the embodiments described herein can encode larger amounts of information in each message including, but not limited to, integer numeric ranges including plaintext modulus values of $p \leq 5$ ([0, 5] or approximately 2 bits of binary data), $p \leq 37$ ([0, 37] or approximately 5 bits), and $p \leq 65,537$ ([0, 65,537] or approximately 16 bits). More generally, the embodiments described herein provide PSA that preserves differential privacy while enabling each client in the plurality of clients 104A-104N to encode a numeric value that is represented by a plurality of bits of binary data. FIG. 5A depicts a security parameter of k=80 (80-bit equivalent security), N=1,000 clients, $\phi(m')=32$, and $\phi(m)=2,048$.

While the prior-art PSA system can encode a single bit of data somewhat more quickly (0.6 ms) compared to the embodiments described herein, the prior-art PSA system would require a longer amount of time to encrypt a larger message, such as 9.6 ms (0.6*16=9.6 ms) to encode 16 separate messages for 16 bits of data that would be similar to $p \leq 65,537$. Additionally, the system 100 and the process 200 perform the decryption operation AggrDec in less than 2 ms while the prior-art PSA system requires 300 ms to decrypt the sum of single-bit values from the clients, which is a speedup factor of ~150 times over the prior art.

Additionally, as depicted in FIG. 5A and FIG. 5B, the amount of time required to perform the NoisyEnc$_i$ and AggrDec operations does not increase substantially as the value of p increases, and the embodiments described herein can scale to much larger numeric ranges while continuing to provide greater performance than the prior-art. Thus, the system 100 and the process 200 provide scalable PSA in which each client may encode a larger numeric range of p (for example, $p \leq 2^{32}$, $p \leq 2^{64}$, and $p \leq 2^{128}$, for 32, 64, and 128 bit values, respectively, that are often used to represent numbers in digital computing systems) in a computationally efficient manner. FIG. 5B depicts additional configurations and parameters of the system 100 that operate with different numbers of clients N and different plaintext modulus ranges p including approximately 16-bit numeric ranges (table 550), 32-bit numeric ranges (table 560), and 128-bit numeric ranges (table 570). Thus, the embodiments described herein provide improvements to the operation of computerized systems that implement PSA by improving client differential privacy and the computational efficiency of the PSA process.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following claims.

What is claimed:

1. A method for operating an aggregator in a private stream aggregation (PSA) system comprising:
   receiving, with a network interface in the aggregator, a plurality of encrypted messages from a plurality of clients, each client in the plurality of clients transmitting one encrypted message in the plurality of encrypted messages, each encrypted message corresponding to a vector in a learning with errors (LWE) public key;
   adding, with a processor in the aggregator, the plurality of encrypted messages to generate an aggregate data set corresponding to a sum of the plurality of encrypted messages;
   extracting, with the processor, a summation of a plurality of error vectors in the plurality of encrypted messages from the aggregate data set using a predetermined matrix stored in a memory of the aggregator corresponding to a portion of the LWE public key in each encrypted message and a predetermined secret key stored in the memory, the predetermined secret key corresponding to a sum of a plurality of secret keys used by the plurality of clients to generate the plurality of encrypted messages;
   multiplying, with the processor, a predetermined gadget matrix stored in the memory with the summation of the plurality of error vectors to generate a summation of encrypted data contained in the plurality of encrypted messages;
   decrypting, with the processor, the summation of the encrypted data contained in the plurality of encrypted messages using a private key stored in the memory of the aggregator to generate a plaintext sum of noisy data generated by the plurality of clients; and
   generating, with the processor, an output of the plaintext sum of noisy data that preserves differential privacy of each client in the plurality of clients.

2. The method of claim 1, the extracting further comprising:
   subtracting, with the processor, a product of the matrix corresponding to the LWE public key multiplied by the predetermined secret key from the aggregate data set to generate the summation of the plurality of error vectors.

3. The method of claim 1, the decrypting further comprising:
   performing an LWE decryption process, with the processor, to decrypt the summation of the encrypted data using the private key stored in the memory to generate the plaintext sum of noisy data generated by the plurality of clients.

4. The method of claim 2, wherein the LWE decryption process is a Brakerski-Gentry-Vaikuntanathan (BGV) decryption process.

5. The method of claim 1, wherein the error vector in each encrypted message of the plurality of messages encodes a value in an integer numeric range p selected from one of [0, 5], [0, 37], or [0, 65537].

6. The method of claim 1, wherein the error vector in each encrypted message of the plurality of messages encodes a value that is represented by a plurality of bits of binary data.

7. A method for operating a first client in a private stream aggregation (PSA) system comprising:
   encrypting, with a processor in the first client, noisy plaintext data using a first public key stored in a memory of the first client to generate an encrypted data vector;
   sampling, with the processor in the first client, the encrypted data vector to generate an error vector with a Gaussian distribution based on the encrypted data vector;
   generating, with the processor in the first client, a vector of a learning with errors (LWE) public key using a predetermined matrix stored in the memory of the first client, a predetermined secret key stored in the memory of the first client, and the error vector, the LWE public key being different than the first public key; and
   transmitting, with a network interface in the first client, a first encrypted message including the vector of the LWE public key to an aggregator.

8. The method of claim 7 further comprising:
   generating, with the processor in the first client, a random integer using a discrete Laplace mechanism; and
   adding, with the processor in the first client, the random integer to plaintext data stored in the memory of the first client to generate the noisy plaintext data.

9. The method of claim 7, the generating of the vector of the LWE public key further comprising:
   generating, with the processor in the first client, the vector of the LWE public key by adding the error vector to a product of the predetermined matrix multiplied by the predetermined secret key.

10. The method of claim 7 further comprising:
    encrypting, with a processor in the first client, the noisy plaintext data using an LWE encryption process with the first public key stored in the memory of the first client to generate the encrypted data vector.

11. The method of claim 10, wherein the LWE encryption process is a Brakerski-Gentry-Vaikuntanathan (BGV) encryption process.

12. The method of claim 7, wherein the vector of the LWE public key encodes a value in an integer numeric range p selected from one of [0, 5], [0, 37], or [0, 65537].

13. The method of claim 7, wherein the vector of the LWE public key encodes a value that is represented by a plurality of bits of binary data.

14. The method of claim 7 further comprising:
    receiving, with a network interface in the aggregator, a plurality of encrypted messages including the first encrypted message and at least one additional encrypted message from a plurality of clients including the first client and at least one additional client, each encrypted message corresponding to a vector in an LWE public key;

adding, with a processor in the aggregator, the plurality of encrypted messages to generate an aggregate data set corresponding to a sum of the plurality of encrypted messages;

extracting, with the processor in the aggregator, a summation of a plurality of error vectors in the plurality of encrypted messages from the aggregate data set using a predetermined matrix stored in a memory of the aggregator, the predetermined matrix corresponding to a portion of the LWE public key in each encrypted message, and a predetermined secret key stored in the memory of the aggregator, the predetermined secret key corresponding to a sum of a plurality of secret keys used by the plurality of clients to generate the plurality of encrypted messages;

multiplying, with the processor in the aggregator, a predetermined gadget matrix stored in the memory of the aggregator with the summation of the plurality of error vectors to generate a summation of encrypted data contained in the plurality of encrypted messages;

decrypting, with the processor in the aggregator, the summation of the encrypted data contained in the plurality of encrypted messages using a private key stored in the memory of the aggregator to generate a plaintext sum of noisy data generated by the plurality of clients; and generating, with the processor in the aggregator, an output of the plaintext sum of noisy data, the aggregator being unable to identify a portion of the output that corresponds to the noisy plaintext data from the first client.

15. The method of claim 14, the decrypting further comprising:

performing an LWE decryption process, with the processor in the aggregator, to decrypt the summation of the encrypted data using the private key stored in the memory of the aggregator to generate the plaintext sum of noisy data generated by the plurality of clients.

16. The method of claim 15, wherein the LWE decryption process is a Brakerski-Gentry-Vaikuntanathan (BGV) decryption process.

17. An aggregator in a private stream aggregation (PSA) system comprising:

a network interface configured to receive encrypted messages from a data network;

a memory configured to store:
a predetermined matrix corresponding to a portion of a learning with errors (LWE) public key;
a predetermined gadget matrix;
a predetermined secret key; and
a private key; and a processor operatively connected to the network interface and the memory, the processor being configured to:
receive a plurality of encrypted messages from a plurality of clients with the network interface, each client in the plurality of clients transmitting one encrypted message in the plurality of encrypted messages, each encrypted message corresponding to a vector in an LWE public key;

add the plurality of encrypted messages to generate an aggregate data set corresponding to a sum of the plurality of encrypted messages;

extract a summation of a plurality of error vectors in the plurality of encrypted messages from the aggregate data set using the predetermined matrix stored in the memory corresponding to a portion of the LWE public key in each encrypted message, and the predetermined secret key stored in the memory, the predetermined secret key corresponding to a sum of a plurality of secret keys used by the plurality of clients to generate the plurality of encrypted messages;

multiply the predetermined gadget matrix stored in the memory with the summation of the plurality of error vectors to generate a summation of encrypted data contained in the plurality of encrypted messages;

decrypt the summation of the encrypted data contained in the plurality of encrypted messages using the private key stored in the memory to generate a plaintext sum of noisy data generated by the plurality of clients; and generate an output of the plaintext sum of noisy data that preserves differential privacy of each client in the plurality of clients.

18. The aggregator of claim 17, the processor being further configured to:
subtract a product of the matrix corresponding to the LWE public key multiplied by the predetermined secret key from the aggregate data set to generate the summation of the plurality of error vectors.

19. The aggregator of claim 17, the processor being further configured to:
perform an LWE decryption process to decrypt the summation of the encrypted data using the private key stored in the memory to generate the plaintext sum of noisy data generated by the plurality of clients.

20. The aggregator of claim 19, wherein the LWE decryption process is a Brakerski-Gentry-Vaikuntanathan (BGV) decryption process.

* * * * *